United States Patent
Kurahashi

(10) Patent No.: US 12,439,187 B2
(45) Date of Patent: Oct. 7, 2025

(54) OPTICAL BRANCHING/COUPLING DEVICE AND METHOD FOR CONTROLLING SAME

(71) Applicant: NEC Corporation, Tokyo (JP)

(72) Inventor: Ryu Kurahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 18/025,781

(22) PCT Filed: Aug. 20, 2021

(86) PCT No.: PCT/JP2021/030527
§ 371 (c)(1),
(2) Date: Mar. 10, 2023

(87) PCT Pub. No.: WO2022/064913
PCT Pub. Date: Mar. 31, 2022

(65) Prior Publication Data
US 2023/0353912 A1   Nov. 2, 2023

(30) Foreign Application Priority Data
Sep. 24, 2020 (JP) ................. 2020-159231

(51) Int. Cl.
*H04Q 11/00* (2006.01)
*H04J 14/02* (2006.01)

(52) U.S. Cl.
CPC .......... *H04Q 11/0062* (2013.01); *H04J 14/02* (2013.01); *H04Q 11/0005* (2013.01);
(Continued)

(58) Field of Classification Search
CPC ........... H04Q 11/0062; H04Q 11/0005; H04Q 2011/0016; H04Q 2011/0081; H04J 14/02
See application file for complete search history.

(56) References Cited

U.S. PATENT DOCUMENTS

| | | | |
|---|---|---|---|
| 5,956,167 A | 9/1999 | Iwata et al. | |
| 6,211,980 B1 * | 4/2001 | Terahara ............... | H04J 14/021 385/24 |

(Continued)

FOREIGN PATENT DOCUMENTS

| | | |
|---|---|---|
| JP | H10-020143 A | 1/1998 |
| WO | 2016/017181 A1 | 2/2016 |

(Continued)

OTHER PUBLICATIONS

Jane Simmons, "Analysis of Internal ROADM Protection", Nov. 12, 2015, 2015 36th IEEE Sarnoff Symposium, All pages (Year: 2015).*

(Continued)

*Primary Examiner* — Pranesh K Barua
(74) *Attorney, Agent, or Firm* — Sughrue Mion, PLLC

(57) ABSTRACT

A branching/coupling device is provided with: first to third optical transmission paths; a first multi/demultiplexer that outputs a first optical signal based on the wavelength-multiplexed optical signals inputted from the second and third optical transmission paths, outputs a second optical signal based on the wavelength-multiplexed optical signals inputted from the first and third optical transmission paths, and outputs a third optical signal based on the wavelength-multiplexed optical signals inputted from the first and second optical transmission paths; a second multi/demultiplexer that outputs one of the first to third optical signals based on the wavelength-multiplexed optical signals; an optical splitter that distributes the wavelength-multiplexed optical signals to the first and second multi/demultiplexer; and an optical switch that selects either the first to third optical signals generated in the first multi/demultiplexer or the second multi/demultiplexer, and outputs the selected optical signals to the output destinations.

16 Claims, 35 Drawing Sheets

(52) U.S. Cl.
CPC ............... *H04Q 2011/0016* (2013.01); *H04Q 2011/0081* (2013.01)

(56) References Cited

U.S. PATENT DOCUMENTS

| | | | |
|---|---|---|---|
| 10,530,470 B2* | 1/2020 | Takigawa | H04B 10/27 |
| 10,771,179 B1 | 9/2020 | Marcenac | |
| 2006/0210266 A1* | 9/2006 | Aoki | H04J 14/0217 398/19 |
| 2010/0034532 A1* | 2/2010 | Ghelfi | H04J 14/0219 398/19 |
| 2012/0243879 A1* | 9/2012 | Nashimoto | H04J 14/02216 398/140 |
| 2013/0259475 A1* | 10/2013 | Ji | H04L 12/28 398/48 |
| 2016/0301467 A1* | 10/2016 | Ji | H04B 10/2589 |
| 2017/0230109 A1* | 8/2017 | Kawai | H04Q 11/0005 |
| 2018/0070156 A1* | 3/2018 | Kawai | H04B 10/29 |
| 2018/0219619 A1 | 8/2018 | Takigawa | |
| 2019/0342027 A1* | 11/2019 | Kawai | H04Q 11/0005 |

FOREIGN PATENT DOCUMENTS

| | | |
|---|---|---|
| WO | 2017/022231 A1 | 2/2017 |
| WO | 2018/105506 A1 | 6/2018 |

OTHER PUBLICATIONS

International Search Report for PCT Application No. PCT/JP2021/030527, mailed on Nov. 2, 2021.
English translation of Written opinion for PCT Application No. PCT/JP2021/030527, mailed on Nov. 2, 2021.
Simmons et al., "Analysis of Internal ROADM Protection", 2015, 36th IEEE Sarnoff Symposium, 2015, pp. 66-69, specifically, pp. 67-68.

* cited by examiner

OPTICAL BRANCHING/COUPLING DEVICE AND METHOD FOR CONTROLLING SAME

This application is a National Stage Entry of PCT/JP2021/030527 filed on Aug. 20, 2021, which claims priority from Japanese Patent Application 2020-159231 filed on Sep. 24, 2020, the contents of all of which are incorporated herein by reference, in their entirety.

TECHNICAL FIELD

The present invention relates to an optical branching/coupling device, a control method therefor, and a recording medium for a control program of an optical branching/coupling device, and in particular, relates to an optical branching/coupling device including a redundant configuration, a control method therefor, and a recording medium for a control program of an optical branching/coupling device.

BACKGROUND ART

FIG. 35 is a diagram illustrating a configuration of a common submarine cable system 9000. In the submarine cable system 9000, three terminals (an A terminal 1, a B terminal 2, and a C terminal 3) are connected to an optical branching/coupling device 90 via optical transmission paths 91 to 98. In the following description and drawings, for example, an optical signal transmitted from the A terminal 1 to the B terminal 2 is referred to as an [AB], and an optical signal transmitted from the A terminal 1 to the C terminal 3 is referred to as an [AC]. An optical signal transmitted between other terminals is similarly referred to. An [AB][AC] indicates that an optical signal [AB] and an optical signal [AC] are transmitted as a wavelength-multiplexed optical signal (hereinafter, referred to as "a WDM signal") subjected to wavelength multiplexing. It is assumed that wavelength bands of optical signals to be wavelength-multiplexed are not overlapped. WDM is an abbreviation of wavelength division multiplexing.

The optical branching/coupling device 90 internally includes a wavelength selective switch (WSS), and by using the WSS, achieves a wavelength switching function (ROADM function) settable from an outside. The WSS includes a function of separating and multiplexing (i.e., multiplexing/demultiplexing), based on external control, input optical signals of a plurality of wavelength bands with respect to each wavelength. WSS is an abbreviation of a wavelength selective switch, and ROADM is an abbreviation of reconfigurable optical add/drop multiplexing (a resettable optical branching/coupling function).

In FIG. 35, between the A terminal 1 and the B terminal 2, optical signals [AB] and [BA] are transmitted. Between the A terminal 1 and the C terminal 3, optical signals [AC] and [CA] are transmitted. Between the B terminal 2 and the C terminal 3, optical signals [BC] and [CB] are transmitted. The optical branching/coupling device 90 multiplexes/demultiplexer, with respect to each wavelength, optical signals received from the A terminal 1, the B terminal 2, and the C terminal 3, generates new optical signal, and outputs the generated optical signal to the A terminal 1, the B terminal 2, and the C terminal 3. In this manner, the optical branching/coupling device 90 achieves bidirectional communication among the A terminal 1, the B terminal 2, and the C terminal 3. In relation to the present invention, PTL 1 and PTL 2 disclose an optical branching/coupling device that communicates with terminals in three locations.

CITATION LIST

Patent Literature

[PTL 1] International Publication No. WO2017/022231
[PTL 2] Japanese Unexamined Patent Application Publication No. H10-020143

SUMMARY OF INVENTION

Technical Problem

In FIG. 35, four optical transmission paths are present between the optical branching/coupling device 90 and the C terminal 3. From the reason, the optical branching/coupling device 90 has a problem that a laying cost for an optical transmission path between the C terminal 3 and the optical branching/coupling device 90 is high. In addition, there is a problem that, when a WSS being a key device of the optical branching/coupling device 90 fails, failure occurs in communication between terminals.

OBJECT OF THE INVENTION

An object of the present invention is to provide a technique for achieving an optical branching/coupling device having a low laying cost and high reliability, and a method for controlling the optical branching/coupling device.

Solution to Problem

An optical branching/coupling device according to the present invention includes:
first to third optical transmission paths that each input and output a wavelength-multiplexed optical signal;
a first multiplexing/demultiplexing means for outputting, based on wavelength-multiplexed optical signals being input from the second and third optical transmission paths, a first optical signal to be output from the first optical transmission path, outputting, based on wavelength-multiplexed optical signals being input from the first and third optical transmission paths, a second optical signal to be output from the second optical transmission path, and outputting, based on wavelength-multiplexed optical signals being input from the first and second optical transmission paths, a third optical signal to be output from the third optical transmission path;
a second multiplexing/demultiplexing means for outputting, based on wavelength-multiplexed signals being input from the first to third optical transmission paths, any one of the first to third optical signals;
an optical branching means for distributing wavelength-multiplexed optical signals being input from the first to third optical transmission paths to the first and second multiplexing/demultiplexing means; and
an optical switching means for selecting, based on each output destination, either of the first to third optical signals being generated in the first multiplexing/demultiplexing means and the first to third optical signals being generated in the second multiplexing/demultiplexing means, and outputting the selected optical signals to the output destination.

A method for controlling an optical branching/coupling device according to the present invention is a method of controlling an optical branching/coupling device including first to third optical transmission paths each inputting/outputting a wavelength-multiplexed optical signal, the method including a procedure of:
   by a first multiplexing/demultiplexing means,
      outputting, based on wavelength-multiplexed optical signals being input from the second and third optical transmission paths, a first optical signal to be output from the first optical transmission path,
      outputting, based on wavelength-multiplexed optical signals being input from the first and third optical transmission paths, a second optical signal to be output from the second optical transmission path, and
      outputting, based on wavelength-multiplexed optical signals being input from the first and second optical transmission paths, a third optical signal to be output from the third optical transmission path;
   by a second multiplexing/demultiplexing means,
      outputting, based on wavelength-multiplexed signals being input from the first to third optical transmission paths, any one of the first to third optical signals;
   by an optical branching means, distributing wavelength-multiplexed optical signals being input from the first to third optical transmission paths to the first and second multiplexing/demultiplexing means; and,
   by an optical switching means, selecting, based on each output destination, either of the first to third optical signals being generated in the first multiplexing/demultiplexing means and the first to third optical signals being generated in the second multiplexing/demultiplexing means, and
   outputting the selected optical signals to the output destination.

Advantageous Effects of Invention

The present invention achieves an optical branching/coupling device having a low laying cost and high reliability and a method for controlling the optical branching/coupling device.

EXAMPLE EMBODIMENT

Example embodiments according to the present invention are described below. An arrow in each drawing illustrates a direction of a signal according to the example embodiments, and does not limit the direction of the signal. An intersection of straight lines each indicating a path of a signal in each block diagram does not indicate branching or coupling between intersecting signals unless otherwise specified. Internal connection of each switch illustrated in a block diagram is merely an example, and does not exclude an example embodiment based on another connection state. A previously-described component in each drawing is assigned with the same reference sign, and therefore overlapping description thereof is omitted. It is assumed that wavelength bands of optical signals to be wavelength-multiplexed are not overlapped.

First Example Embodiment

Figure 1:
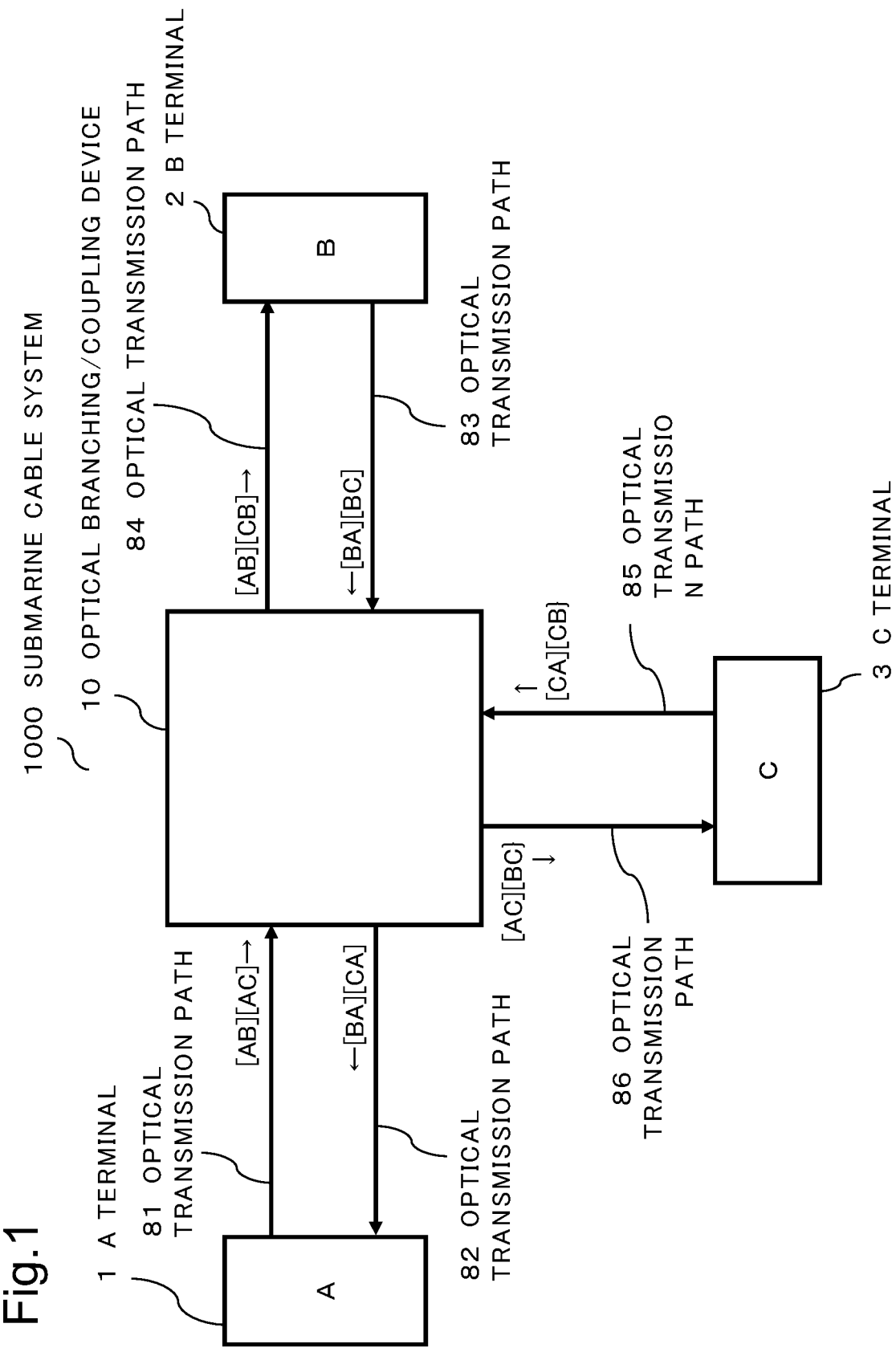
FIG. 1 is a block diagram illustrating a configuration example of a submarine cable system 1000 according to a first example embodiment.

FIG. 1 is a block diagram illustrating a configuration example of a submarine cable system 1000 according to a first example embodiment of the present invention. The submarine cable system 1000 includes an A terminal 1, a B terminal 2, a C terminal 3, and an optical branching/coupling device 10. When the A terminal 1, the B terminal 2, and the C terminal 3 are collectively referred to, terminals 1 to 3 are referred to.

In FIG. 1, the terminals 1 to 3 mutually perform bidirectional communication. The terminals 1 to 3 each are a terminal installed on land, and are an interface between an optical signal transmitted in the submarine cable system 1000 and a network on land. The terminals 1 to 3 are connected to the optical branching/coupling device 10 via optical transmission paths 81 to 86. The optical transmission paths 81 to 86 each are an optical fiber for transmitting an optical signal. The optical transmission paths 81 to 86 may be included in a submarine cable connecting the terminals 1 to 3 and the optical branching/coupling device 10. For example, the optical transmission paths 81 and 82 are included in a submarine cable connecting the A terminal 1 and the optical branching/coupling device 10. The optical transmission paths 81 to 86 may include, in a midway, an optical repeater and another optical branching/coupling device. A configuration of the submarine cable system 1000 is also applicable to an optical transmission system on land.

The optical branching/coupling device 10 is a node including an ROADM function, and is also referred to as an ROADM branching/coupling device or an ROADM node. The optical branching/coupling device 10 is installed on a sea bottom, and splits and couples (multiplexes/demultiplexer) an input optical signal (main signal) with respect to each wavelength band, and thereby switches, based on a wavelength unit, a terminal being an output destination of the optical signal. The ROADM function is controlled by a control unit included in the optical branching/coupling device 10.

The A terminal 1 outputs an optical signal [AB][AC] to the optical branching/coupling device 10. The B terminal 2 outputs an optical signal [BA][BC] to the optical branching/coupling device 10. The C terminal 3 outputs an optical signal [CA][CB] to the optical branching/coupling device 10. An optical signal [AB] is an optical signal, being output by the A terminal 1, having the B terminal 2 as a destination address, and an optical signal [BA] is an optical signal, being output by the B terminal 2, having the A terminal 1 as a destination address. Other signals are described similarly.

A function of the optical branching/coupling device 10 is described. The optical branching/coupling device 10 receives, from each of the terminals 1 to 3, an optical signal [AB][AC], an optical signal [BA][BC], and an optical signal [CA][CB], respectively. The optical branching/coupling device 10 demultiplexes the received optical signal with respect to each wavelength band. Then, the optical branching/coupling device 10 multiplexes (wavelength-multiplexes) optical signals [AB] and [CB], and generates an optical signal [AB][CB]. The generated optical signal [AB][CB] is output to the B terminal 2. Herein, the optical signal [AB][CB] is a WDM signal in which the optical signal [AB] and the optical signal [CB] are wavelength-multiplexed. The optical branching/coupling device 10 similarly generates an optical signal [AC][BC] and outputs the generated optical signal to the C terminal 3, and generates an optical signal [BA][CA] and outputs the generated optical signal to the A terminal 1. In this manner, the optical branching/coupling device 10 achieves, among the terminals 1 to 3, bidirectional communication using a WDM signal.

Figure 2:
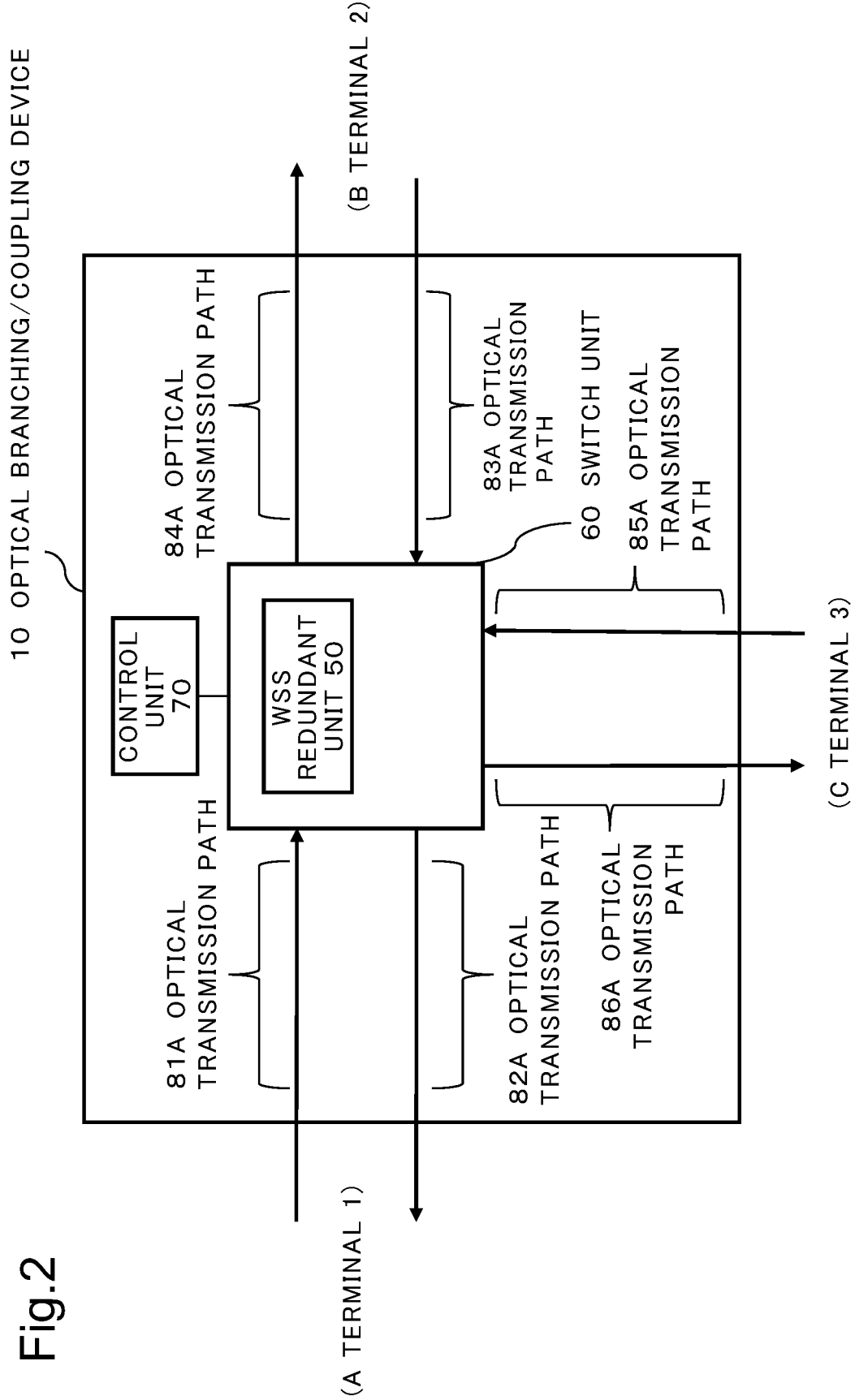
FIG. 2 is a block diagram illustrating an example of a basic configuration of an optical branching/coupling device 10.

FIG. 2 is a block diagram illustrating an example of a basic configuration of the optical branching/coupling device 10 according to the first example embodiment. The optical branching/coupling device 10 includes a switch unit 60 and a control unit 70. The switch unit 60 multiplexes/demultiplexes an optical signal being input from each of the terminals 1 to 3, and outputs the multiplexed/demultiplexed optical signal to a terminal as a destination address. The optical signal is input from optical transmission paths 81A, 83A, and 85A to the switch unit 60. The multiplexed/demultiplexed optical signal is output to each of the terminals 1 to 3 via optical transmission paths 82A, 84A, and 86A, respectively. The optical transmission paths 81A to 86A each are an internal portion of the optical branching/coupling device 10 with respect to the optical transmission paths 81 to 86 connecting the terminals 1 to 3 and the switch unit 60. The optical transmission paths 81A to 86A are connected to a submarine cable by using splicing or an optical connector, and each configure a part of the optical transmission paths 81 to 86 in FIG. 1.

The switch unit 60 includes a WSS, an optical coupler, an optical switch, and a WSS redundant unit 50. These components are described in the present example embodiment and the following example embodiment. The control unit 70 is a circuit that controls the switch unit 60. The control unit 70 may include an electric circuit and a photoelectric conversion circuit. The control unit 70 controls the WSS and the switch in the switch unit 60 in such a way as to output, to a predetermined terminal, an optical signal being input from the terminals 1 to 3. When at least one of WSSs included in the switch unit 60 fails, the control unit 70 controls the WSS, the switch, and the WSS redundant unit 50 in the switch unit 60 in such a way as to execute a step described below. In the following drawings, illustration of electric connection for controlling, by the control unit 70, each unit of the optical branching/coupling device is omitted.

Figure 3:
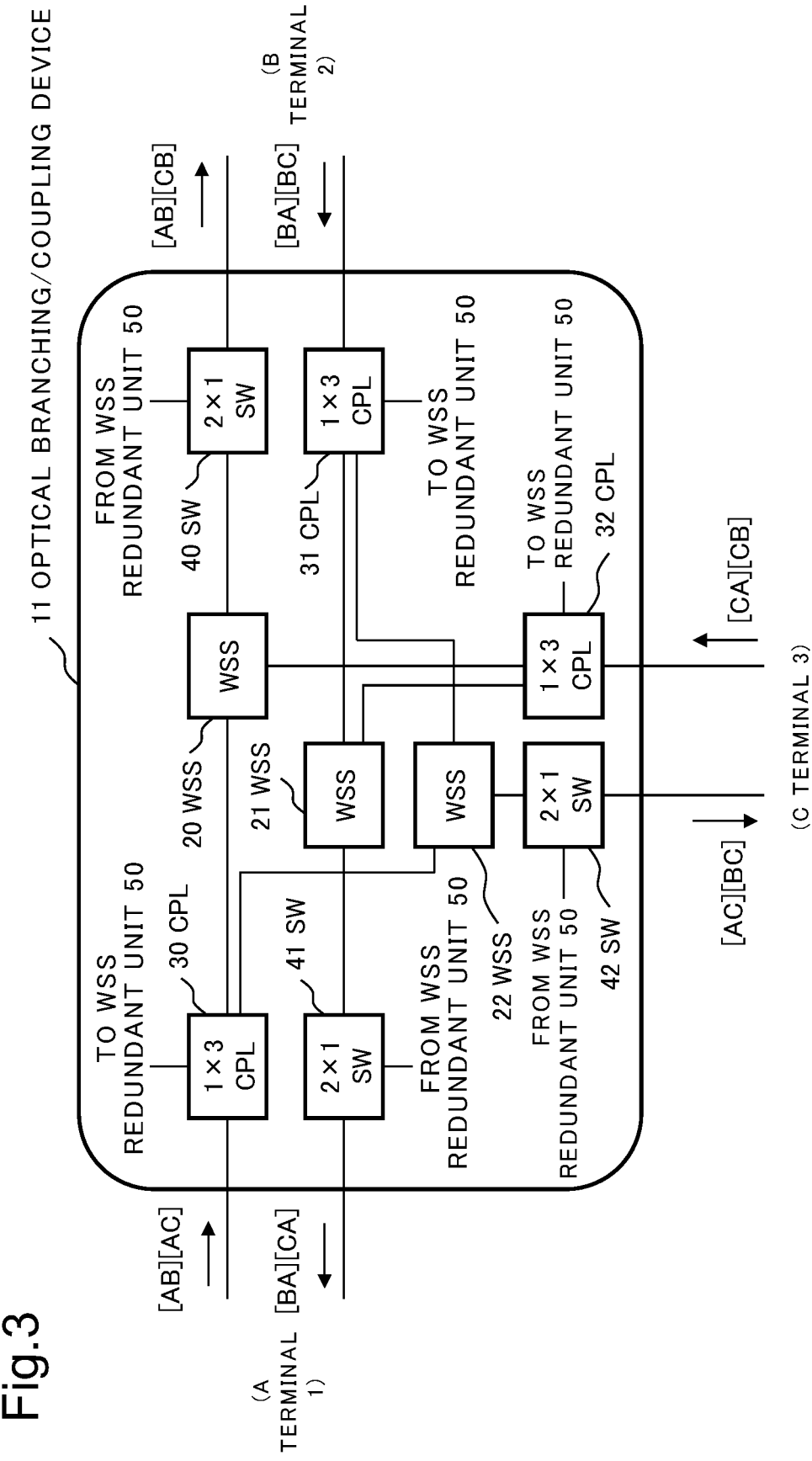
FIG. 3 is a block diagram illustrating a configuration example of an optical branching/coupling device 11.

FIG. 3 is a block diagram illustrating a configuration example of an optical branching/coupling device 11 according to the first example embodiment. The optical branching/coupling device 11 is one form of the optical branching/coupling device 10 in FIG. 2. However, in order to simplify a drawing, in the drawing in FIG. 3 and the following similar drawings, illustration of the control unit 70 and the WSS redundant unit 50 is omitted. Each of optical signals being input from an A terminal 1, a B terminal 2, and a C terminal 3 is split by couplers (CPLs) 30, 31, and 32, respectively.

The couplers 30 to 32 each are, for example, a 1×3 star coupler. WSSs 20 to 22 each are a wavelength selective switch. The WSSs 20 to 22 each multiplex/demultiplex optical signals being input from two couplers with respect to each wavelength band, and generate a new optical signal. Switches (SWs) 40, 41, and 42 each select one of optical signals being input from two WSSs and the WSS redundant unit 50, and output the selected optical signal to the B terminal 2, the A terminal 1, and the C terminal 3 each. The switches 40 to 42 each are, for example, a 3×1 optical switch.

In FIG. 3, the optical branching/coupling device 11 performs bidirectional communication with the C terminal 3, based on an optical signal [AC][BC] and an optical signal [CA][CB]. Therefore, only two optical transmission paths are required between the optical branching/coupling device 11 and the C terminal 3, and therefore a laying cost of an optical transmission path between the optical branching/coupling device 11 and the C terminal 3 can be reduced.

Figure 4:
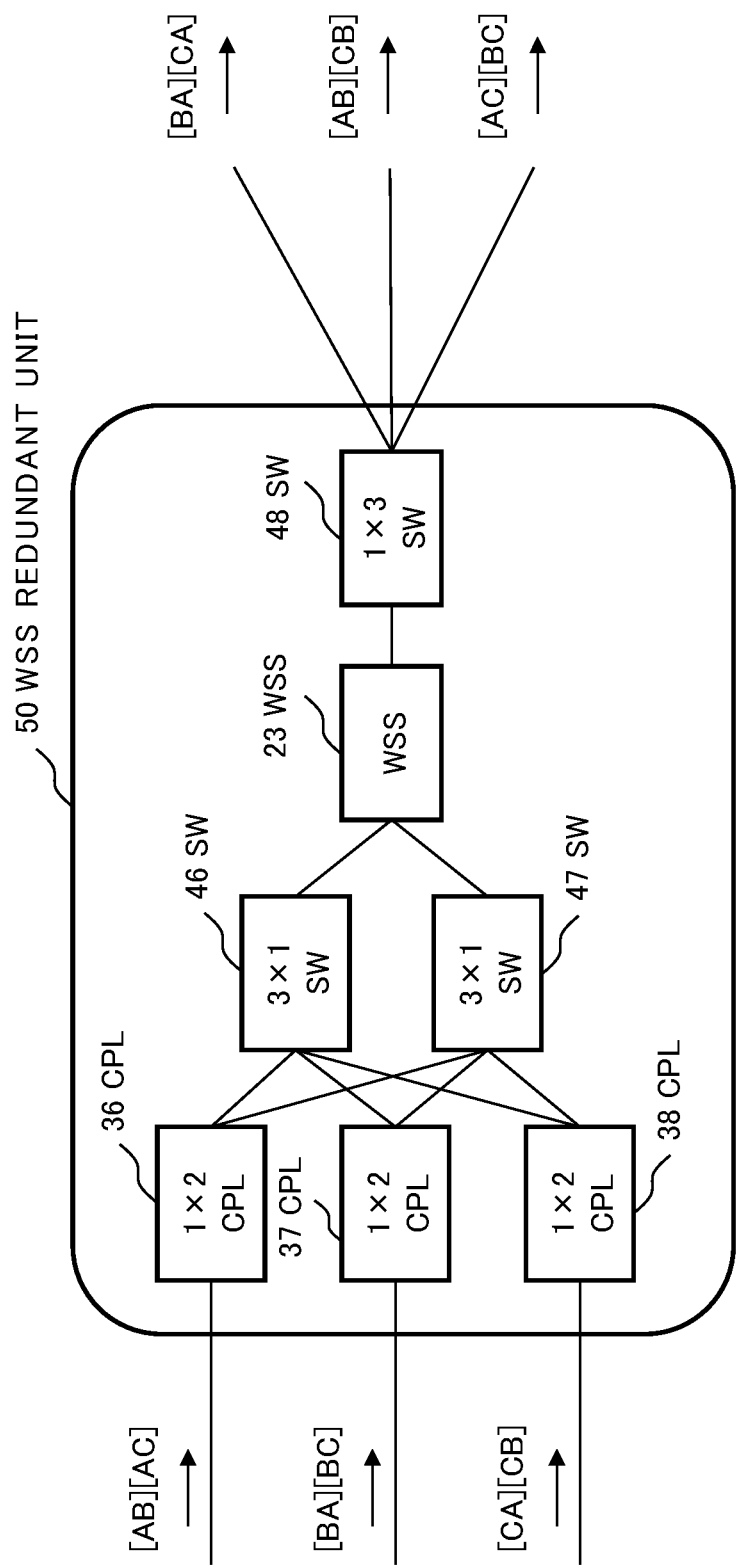
FIG. 4 is a block diagram illustrating a configuration example of a WSS redundant unit 50.

FIG. 4 is a block diagram illustrating a configuration example of the WSS redundant unit 50. The WSS redundant unit 50 is included inside the optical branching/coupling device 11. The WSS redundant unit 50 generates, when one of the WSSs 20 to 22 fails, a WDM signal, instead of the WSS having failed. Thereby, redundancy of the WSSs 20 to 22 being key devices of the optical branching/coupling device 11 can be ensured.

The WSS redundant unit 50 includes couplers (CPLs) 36 to 38, switches (SWs) 46 to 48, and a WSS 23. The couplers 36 to 38 each are a 1×2 optical coupler. The switches 46 and 47 each are a 3×1 optical switch, and the switch 48 is a 1×3 optical switch. The switches 46 and 47 may be achieved by combining 2×1 optical switches, and the switch 48 may be achieved by combining 1×2 optical switches. The WSS 23 and the switches 46 to 48 are controlled by the control unit 70 in FIG. 2.

Each of optical signals split by the couplers 30 to 32 in FIG. 3 is input to the couplers 36 to 38 of the WSS redundant unit 50, respectively. Then, the couplers 36 to 38 each split an optical signal [AB][AC], an optical signal [BA][BC], and an optical signal [CA][CB] to be split by the couplers 30 to 32, respectively, and input the split optical signals to the switches 46 and 47. The switches 46 and 47 each select one of the three input optical signals, and output the selected optical signal to the WSS 23. The WSS 23 multiplexes/demultiplexes optical signals being input from the switches 46 and 47, and generates any one of an optical signal [BA][CA], an optical signal [AB][CB], and an optical signal [AC][BC]. The switch 48 outputs, based on an optical signal output from the WSS 23, the optical signal generated by the WSS 23 to any one of the switches 40 to 42 in FIG. 3. Specifically, the WSS redundant unit 50 outputs the optical signal [BA][CA] to the switch 41 in FIG. 3. Alternatively, the WSS redundant unit 50 outputs the optical signal [AB][CB] to the switch in FIG. 3. Alternatively, the WSS redundant unit 50 outputs the optical signal [AC][BC] to the switch 42 in FIG. 3.

When, for example, in FIG. 3, the WSS 20 fails, an optical signal [AB][CB] is not generated. When the control unit 70 detects the failure of the WSS 20, the control unit 70 controls the WSS redundant unit 50 in such a way as to output the optical signal [AB][CB], based on an optical signal [AB][AC] being input from the coupler 30 and an optical signal [CA][CB] being input from the coupler 32. The control unit 70 controls the switch 40 in such a way that the optical signal [AB][CB] output by the WSS redundant unit 50 is output to the B terminal 2. Also, when only the WSS 21 or the WSS 22 fails, the WSS redundant unit 50 can similarly generate an optical signal [BA][CA] or an optical signal [AC][BC]. Based on control of the switch 41 or 42, the optical signal [BA][CA] or the optical signal [AC][BC] can be output to the A terminal 1 or the C terminal 3, respectively. Based on such an operation of the WSS redundant unit 50 and the switches 40 to 43, the optical branching/coupling device 11 can maintain, even when any one of the WSSs 20 to 22 fails, bidirectional communication among the terminals 1 to 3.

Modified Example of WSS Redundant Unit 50

Figure 5:
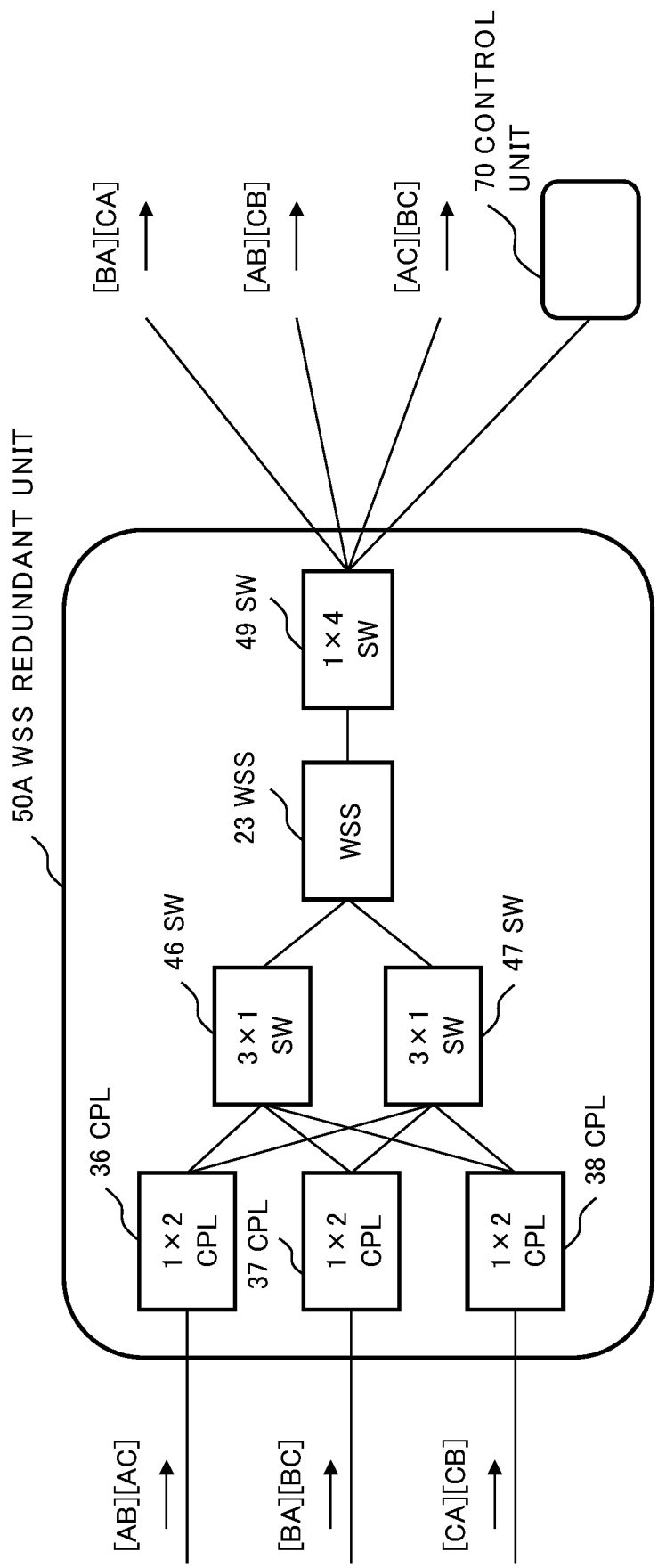
FIG. 5 is a block diagram illustrating a configuration example of a WSS redundant unit 50A.

FIG. 5 is a block diagram illustrating a configuration example of a WSS redundant unit 50A. The WSS redundant unit 50A is a modified example of the WSS 50. The WSS 50A includes, instead of the switch 48, a switch 49. The switch 49 is a 1×4 optical switch. The switch 49 may be achieved by combining 1×2 optical switches. One of 4 outputs of the switch 49 is connected to the control unit 70. The control unit 70 is configured by including, in addition to a circuit for controlling the optical branching/coupling device 11, a photodiode (PD) or an OSM device. OSM is an abbreviation of optical spectrum monitoring. The control unit 70 outputs, as a digital amount, a spectrum and intensity of an optical signal being input from the switch 49. In other words, the WSS redundant unit 50A can monitor characteristics of an optical signal generated by the WSS 23. According to the present example embodiment and the following example embodiment, the WSS redundant unit 50A can be used, instead of the WSS redundant unit 50.

The optical branching/coupling device 11 described above connects the terminals 1 to 3 by using two optical transmission paths for each, and includes the WSS redundant unit 50 or 50A. The WSS redundant unit 50 or 50A is used, and thereby, even when a WSS included in the optical branching/coupling device 11 fails, bidirectional communication among the terminals is maintained. In other words, the optical branching/coupling device 11 achieves an optical branching/coupling device having a low laying cost and high reliability and a method of controlling the optical branching/coupling device.

(Another Description of Optical Branching/Coupling Device 11)

A configuration and a function of the optical branching/coupling device 11 can be also described as follows. A figure in parentheses is a reference sign of a relevant component in FIGS. 1 to 3. An optical branching/coupling device (11) includes first to third optical transmission paths (81A to 86A), first multi/demultiplexers (20 to 22), second multi/demultiplexers (50 and 50A), optical branchers (30 to 32), and optical switches (40 to 42).

The first to third optical transmission paths each input and output a wavelength-multiplexed optical signal. The first multi/demultiplexer is a generic name of the WSSs 20 to 22. In other words, the first multi/demultiplexer outputs, based on wavelength-multiplexed optical signals being input from the second and third optical transmission paths, a first optical signal to be output from the first optical transmission path. The first multi/demultiplexer outputs, based on wavelength-multiplexed optical signals being input from the first and third optical transmission paths, a second optical signal to be output from the second optical transmission path. The first multi/demultiplexer further outputs, based on wavelength-multiplexed optical signals being input from the first and second optical transmission paths, a third optical signal to be output from the third optical transmission path. The first multi/demultiplexer plays a role as the first multiplexing/demultiplexing means including these functions.

The second multi/demultiplexer is relevant to the WSS redundant unit 50 or 50A. In other words, the second multi/demultiplexer plays a role as the second multiplexing/demultiplexing means that outputs, based on wavelength-multiplexed signals being input from the first to third optical transmission paths, any one of first to third optical signals.

The optical brancher is a generic name of the couplers 30 to 32. In other words, the optical brancher plays a role as the optical branching means that distributes wavelength-multiplexed optical signals being input from the first to third optical transmission paths to the first and second multiplexing/demultiplexing means.

The optical switch is a generic name of the switches 40 to 42. In other words, the optical switch plays a role as the optical switching means that selects, based on each output destination, either of first to third optical signals being generated in the first multiplexing/demultiplexing means and first to third optical signals being generated in the second multiplexing/demultiplexing means, and outputs the selected optical signal to the output destination.

Also in the optical branching/coupling device 11 described in this manner, the terminals 1 to 3 are connected by using two optical transmission paths for each, and when the first multi/demultiplexer fails, the second multi/demultiplexer can substitute for a function of the first multi/demultiplexer by using the optical brancher and the optical switch. In other words, the optical branching/coupling device 11 achieves an optical branching/coupling device having a low laying cost and high reliability and a method of controlling the optical branching/coupling device.

Second Example Embodiment

Figure 6:
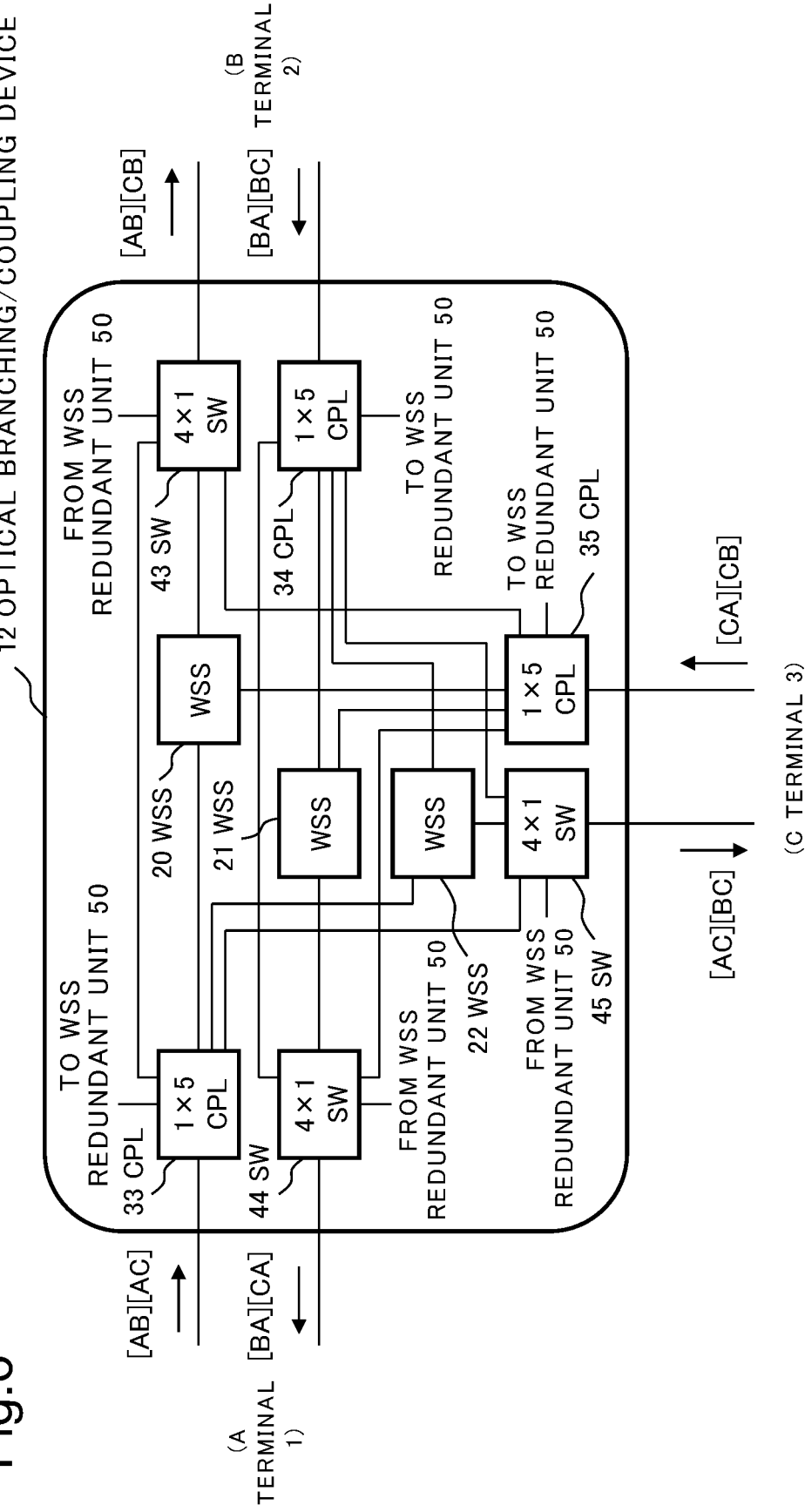
FIG. 6 is a block diagram illustrating a configuration example of an optical branching/coupling device 12.

FIG. 6 is a block diagram illustrating a configuration example of an optical branching/coupling device 12 according to a second example embodiment. The optical branching/coupling device 12 is one form of the optical branching/coupling device 10 in FIG. 2. The optical branching/coupling device 12 is different from the optical branching/coupling device 11 in FIG. 3 in that, instead of the couplers 30 to 32 and the switches 40 to 42, couplers 33 to 35 and switches 43 to 45 are included respectively. The couplers 33 to 35 each are, for example, a 1×5 star coupler, and the switches 43 to 45 each are, for example, a 4×1 optical switch. The optical branching/coupling device 12 includes an optical circuit (optical bypass circuit) that directly connects the couplers 33 to 35 and the switches 43 to 45. The optical bypass circuit directly transfers optical signals split by the couplers 33 to 35 to the switches 43 to 45.

The coupler 33 outputs an input optical signal [AB][AC] to WSSs 20 and 22 and a WSS redundant unit 50, and also outputs to the switches 43 and 45. The coupler 34 outputs an input optical signal [BA][BC] to a WSSs 21 and 22, and the WSS redundant unit 50, and also outputs to the switches 44 and 45. The coupler 35 outputs an input optical signal [CA][CB] to the WSSs 20 and 21 and the WSS redundant unit 50, and also outputs to the switches 43 and 44. The switch 43 selects any one of optical signals input from the WSS 20, the WSS redundant unit 50, the coupler 33, and the coupler 35, and outputs the selected optical signal to a B terminal 2. The switch 44 selects any one of optical signals input from the WSS 21, the WSS redundant unit 50, the coupler 34, and the coupler 35, and outputs the selected optical signal to an A terminal 1. The switch 45 selects any one of optical signals input from the WSS 22, the WSS redundant unit 50, the coupler 33, and the coupler 34, and outputs the selected optical signal to a C terminal 3.

Figure 10:
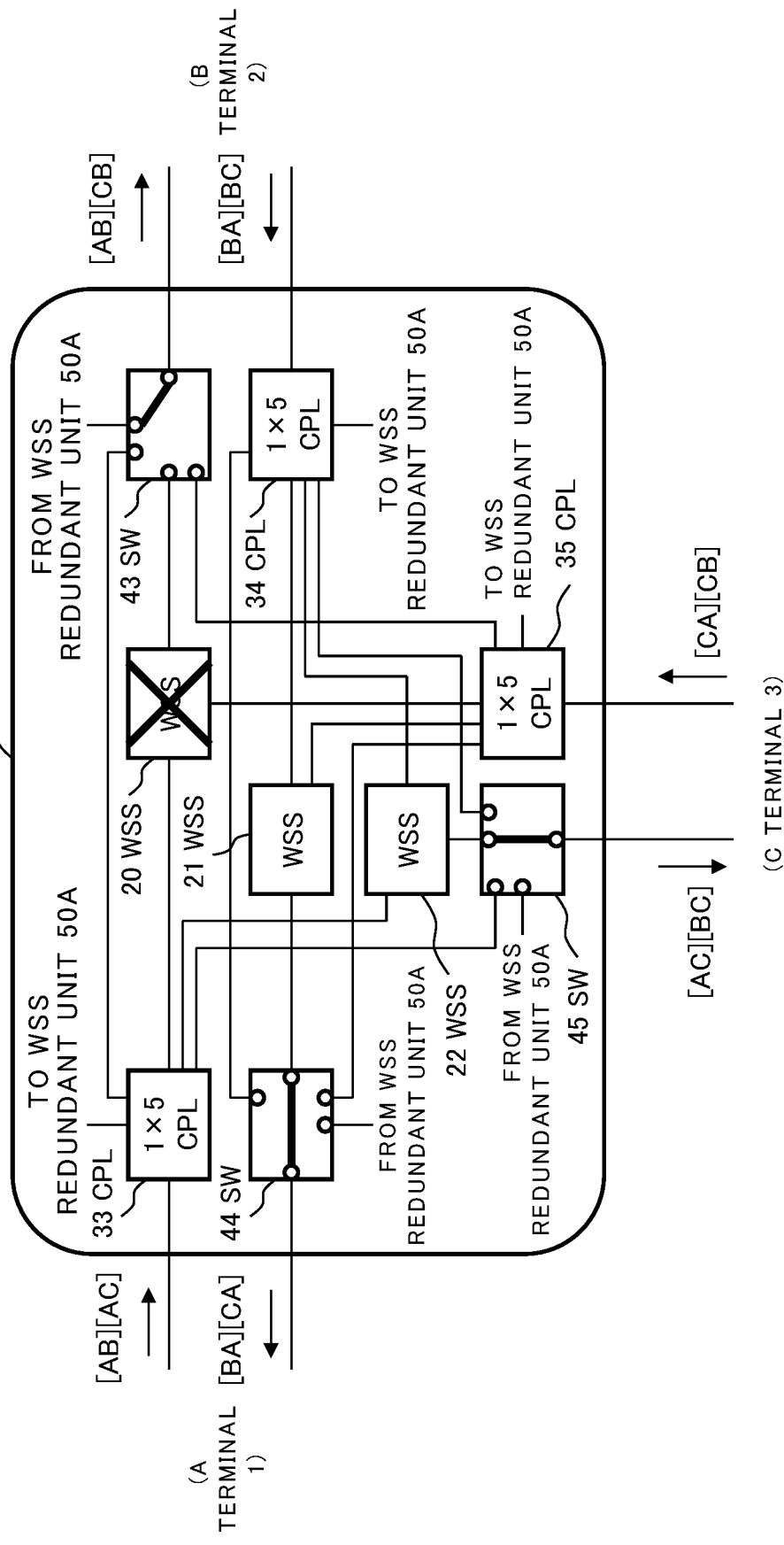
FIG. 10 is a diagram illustrating an example of a state of the switches 43 to 45 in which the WSS 20 fails.

In the optical branching/coupling device 12 including such a configuration, when two of the WSSs 20 to 22 fail, an optical signal generated by the WSS redundant unit 50 instead of one of the WSSs having failed is output to a terminal. With regard to transmission of an optical signal relevant to the other WSS having failed, an optical signal input to the optical branching/coupling device 12 is directly output to a terminal via an optical bypass circuit When, for example, two WSSs being the WSS 21 and the WSS 22 fail, the WSS 21 cannot output an optical signal [BA][CA], and the WSS 22 cannot output an optical signal [AC][BC]. The WSS redundant unit 50 can select any one of substitution for a function of the WSS 21, substitution for a function of the WSS 22, and no substitution for a function of any of the WSSs. When, for example, the WSS redundant unit 50 substitutes for the function of the WSS 21, the optical branching/coupling device 12 operates as described below. The WSS redundant unit 50 multiplexes/demultiplexer an optical signal [BA][BC] split by the coupler 34 and an optical signal [CA][CB] split by the coupler 35, and thereby generates an optical signal [BA][CA]. The WSS redundant unit 50 outputs the generated optical signal [BA][CA] to the switch 44. In contrast, since the WSS 22 also fails, an optical signal [AC][BC] is not input to the switch 45. Therefore, the switch 45 selects, instead of the optical signal [AC][BC], either an optical signal [AB][AC] split by the coupler 33 or an optical signal [BA][BC] split by the coupler 34, and outputs the selected optical signal to the C terminal 3. Thereby, transmission of an optical signal [AC] or an optical signal [BC] to the C terminal 3 is maintained. Instead of the WSS redundant unit 50, the WSS redundant unit 50A illustrated in FIG. 5 may be used. Details of an operation in which the WSSs 20 to 22 fail are illustrated in FIG. 10 and the following figures.

The optical branching/coupling device 12 further includes, compared with the optical branching/coupling device 11, an optical bypass circuit. Therefore, even when a plurality of WSSs fail, bidirectional communication among the terminals can be maintained. In other words, the optical branching/coupling device 12 also exhibits an advantageous effect of a low laying cost and high reliability.

Modified Example of Optical Branching/Coupling Device 12

Figure 7:
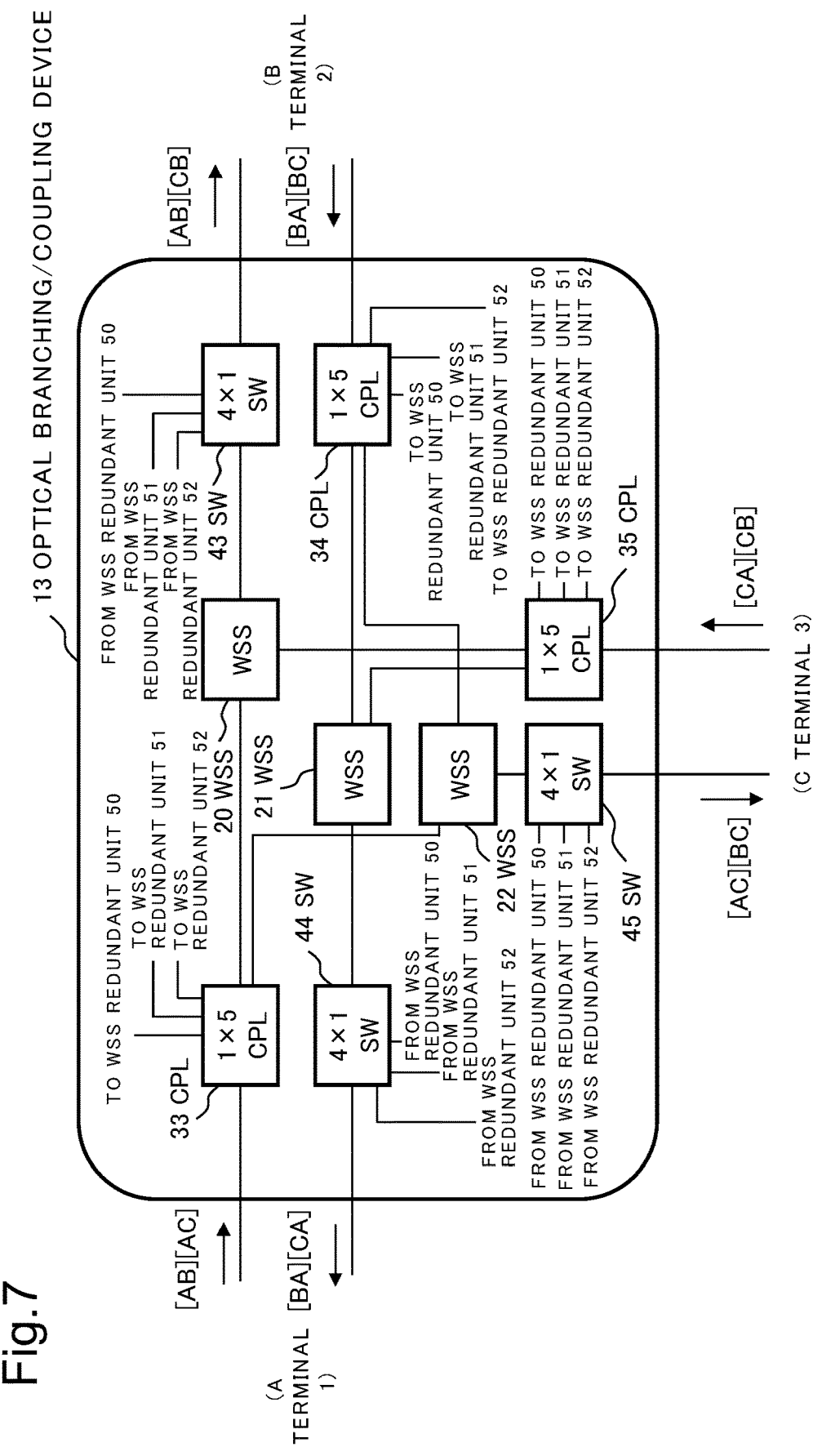
FIG. 7 is a block diagram illustrating a configuration example of an optical branching/coupling device 13.

FIG. 7 is a block diagram illustrating a configuration example of an optical branching/coupling device 13. The optical branching/coupling device 13 is a modified example of the optical branching/coupling device 12 according to the second example embodiment. The optical branching/coupling device 13 includes a plurality of WSS redundant units, and thereby has higher redundancy. The optical branching/coupling device 13 includes WSS redundant units 50 to 52. The WSS redundant units 51 and 52 each include a configuration similar to the WSS redundant unit 50, and are connected between couplers 33 to 35 and switches 43 to 45. In other words, the WSS redundant units 51 and 52 are disposed in parallel with the WSS redundant unit 50. The switches 43, 44, and 45 select any one of optical signals output from the WSS redundant units 50 to 52, and output the selected optical signal to the B terminal 2, the A terminal 1, and the C terminal 3, respectively. When all of the WSSs 20 to 22 fail, instead of the WSSs 20 to 22 having failed, the WSS redundant units 50 to 52 multiplex/demultiplex optical signals, and output the multiplexed/demultiplexed optical signals to the switches 43 to 45, respectively. Based on such a configuration, the optical branching/coupling device 13 can also maintain, even when a plurality of WSSs fail, bidirectional communication among the terminals. In other words, the optical branching/coupling device 13 also exhibits an advantageous effect of a low laying cost and high reliability.

(Details of Operation of Optical Branching/Coupling Device 12)

With regard to the optical branching/coupling device 12 including an optical bypass circuit illustrated in FIG. 6, details of an operation according to a failure state of the WSSs 20 to 22 are described below.

(1) Case where any of WSSs 20 to 22 does not Fail

Figure 8:
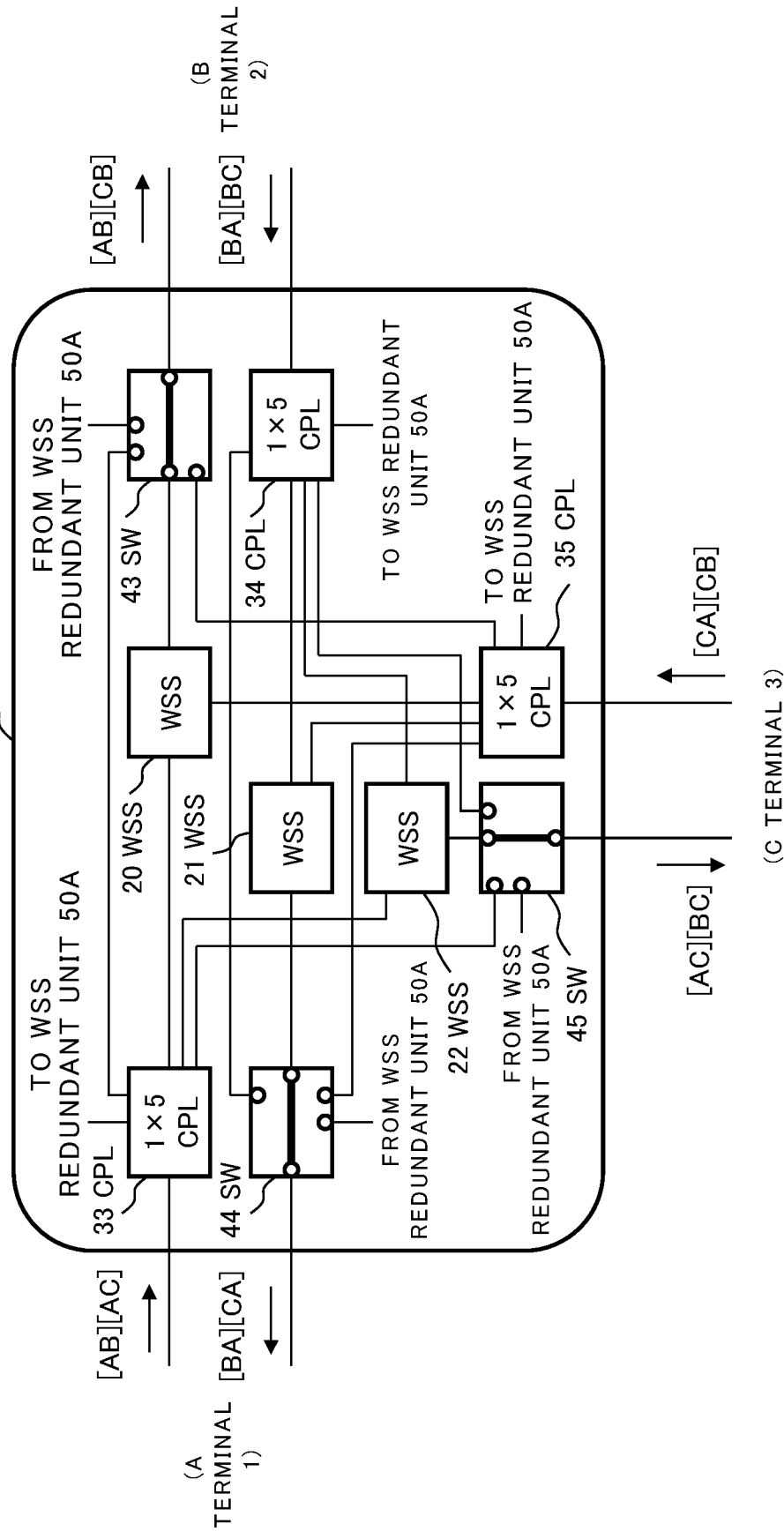
FIG. 8 is a diagram illustrating an example of a state of switches 43 to 45 in which any of WSSs 20 to 22 does not fail.

FIG. 8 illustrates an example of a state of the switches 43 to 45 in which any of the WSSs 20 to 22 of the optical branching/coupling device 12 does not fail. Hereinafter, as a WSS redundant unit, the WSS redundant unit 50A described in FIG. 5 is used. However, also when the WSS redundant unit 50 is used, the following description is applicable. From each of the terminals 1 to 3, an optical signal [AB][AC], an optical signal [BA][BC], and an optical signal [CA][CB] are input, respectively. The WSSs 20 to 22 each generate, based on these optical signals, an optical signal [AB][CB], an optical signal [BA][CA], or an optical signal [AC][BC], and output the generated optical signal to the switches 43, 44, and 45, respectively. A control unit 70 controls the switches 43 to 45 in such a way as to output the optical signals being input from the WSSs 20 to 22 to an outside of the optical branching/coupling device 12.

Figure 9:
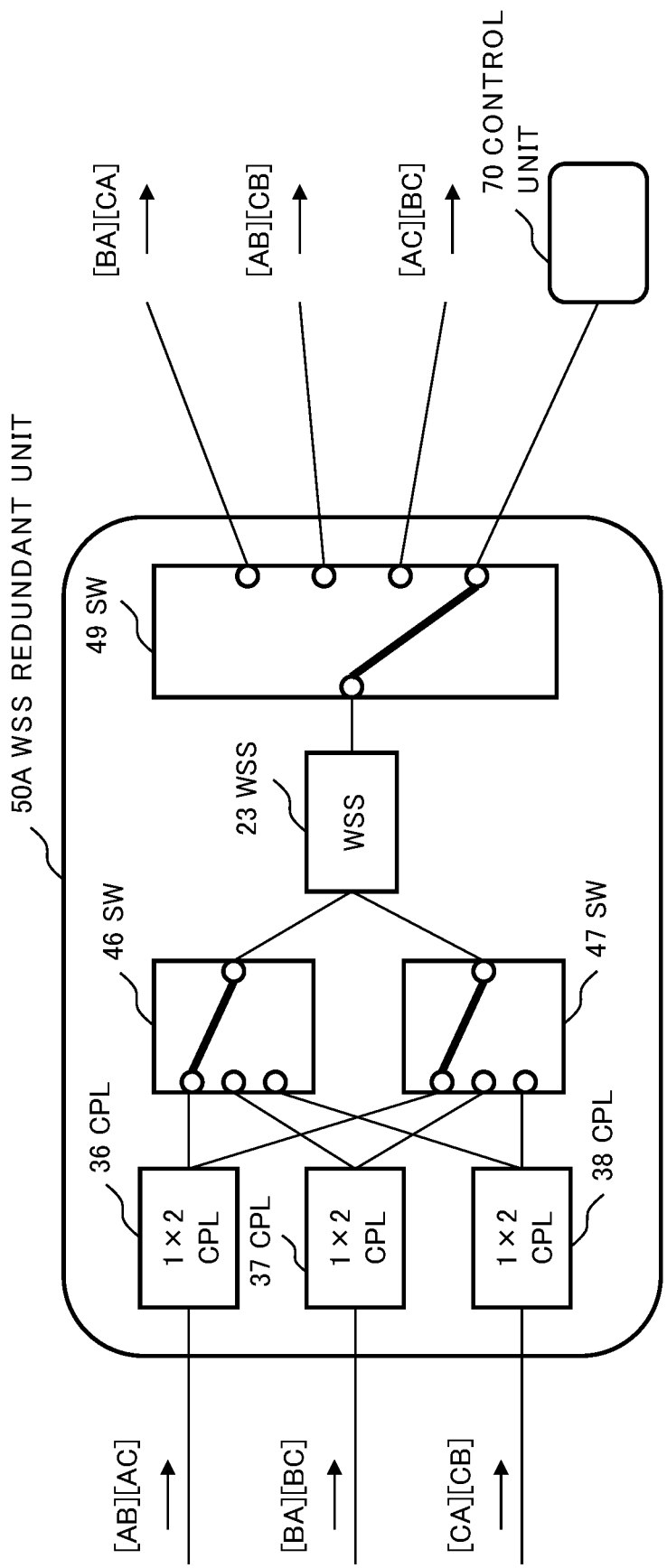
FIG. 9 is a diagram illustrating an example of a state of the WSS redundant unit 50A in the state in FIG. 8.

FIG. 9 illustrates an example of a state of the WSS redundant unit 50A in which the optical branching/coupling device 12 is in the state in FIG. 8. The WSS redundant unit 50A can monitor, by the control unit 70, an optical signal based on an optical signal [AB][AC], an optical signal [BA][BC], or an optical signal [CA][CB]. The control unit 70 controls the WSS 23 and the switches 46, 47, and 49 in such a way as to input an optical signal to be monitored to the control unit 70. The WSS 23 is controlled, and thereby the control unit 70 can also monitor not only an optical signal being input to the WSS redundant unit 50A but also, for example, characteristics of an optical signal [AB][CB], an optical signal [BA][CA], and an optical signal [AC][BC] generated by the WSS 23.

(2) Case where WSS 20 Fails

Figure 11:
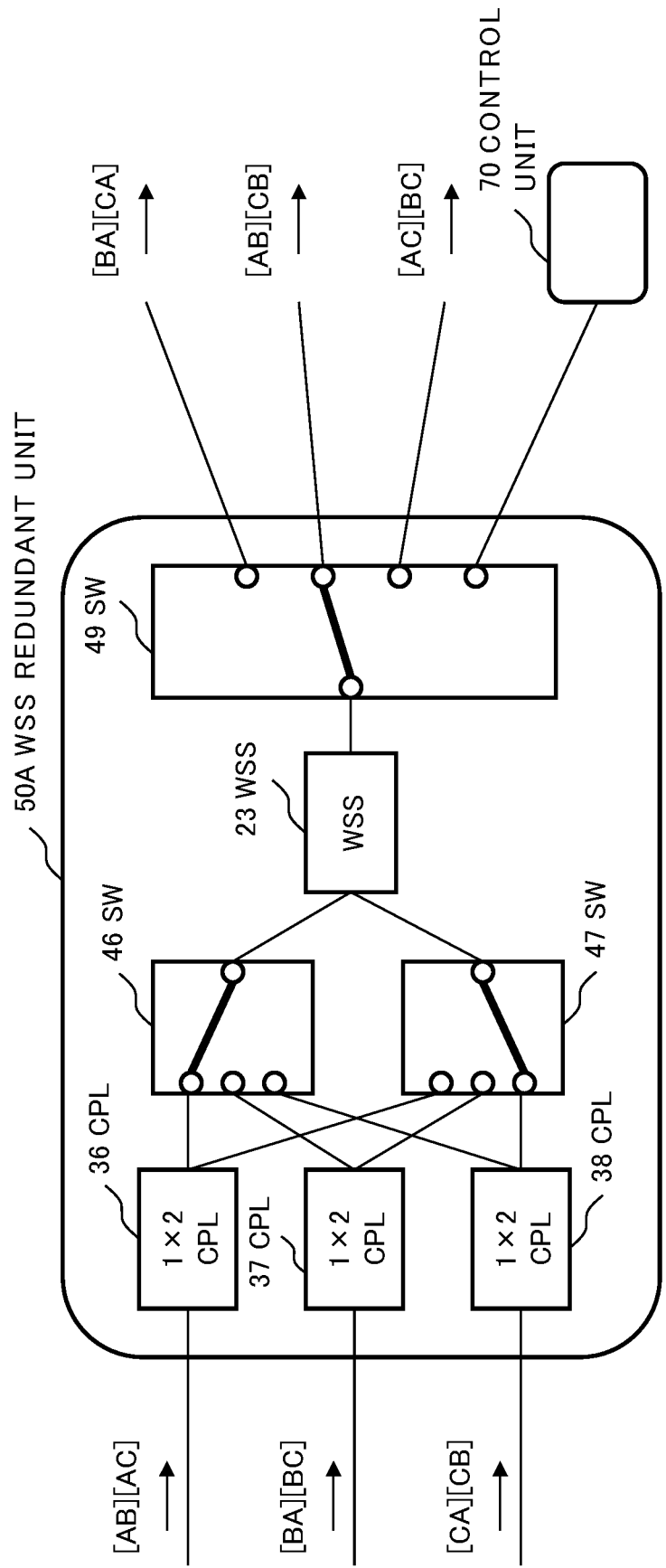
FIG. 11 is a diagram illustrating an example of a state of the WSS redundant unit 50A in the state in FIG. 10.

FIG. 10 illustrates an example of a state of the switches 43 to 45 in which the WSS 20 (a mark x) of the optical branching/coupling device 12 fails. FIG. 11 illustrates an example of a state of the WSS redundant unit 50A in which the optical branching/coupling device 12 is in the state in FIG. 10. Based on control of the control unit 70, the WSS redundant unit 50A generates, based on an optical signal [AB][AC] and an optical signal [CA][CB], an optical signal [AB][CB], and outputs the generated optical signal to the switch 43 in FIG. 10. Thereby, the optical branching/coupling device 12 can output, even when the WSS 20 fails, the optical signal [AB][CB] to the B terminal 2, similarly to a case where the WSS 20 does not fail.

(3) Case where WSS 21 Fails

Figure 12:
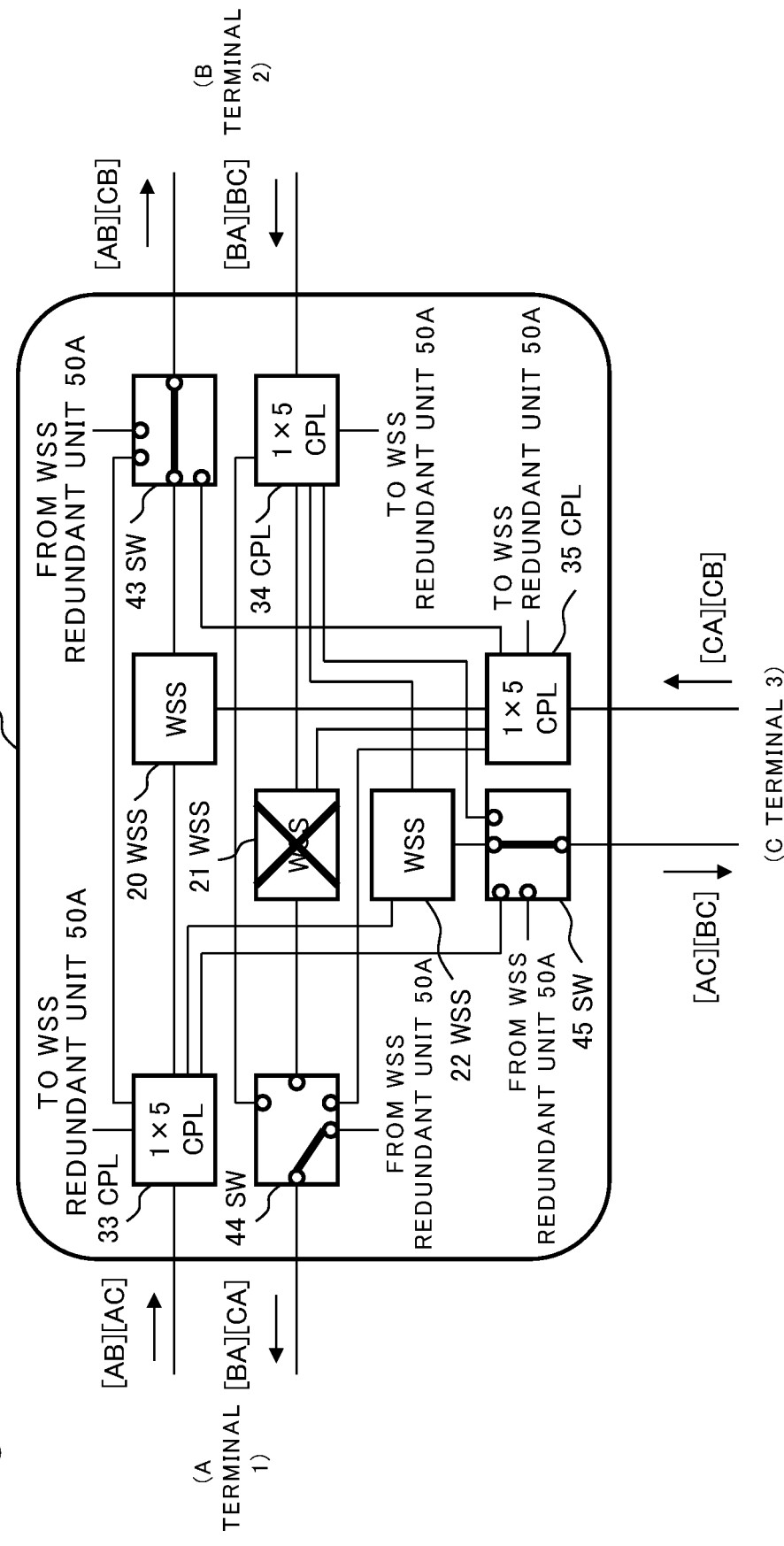
FIG. 12 is a diagram illustrating an example of a state of the switches 43 to 45 in which the WSS 21 fails.
Figure 13:
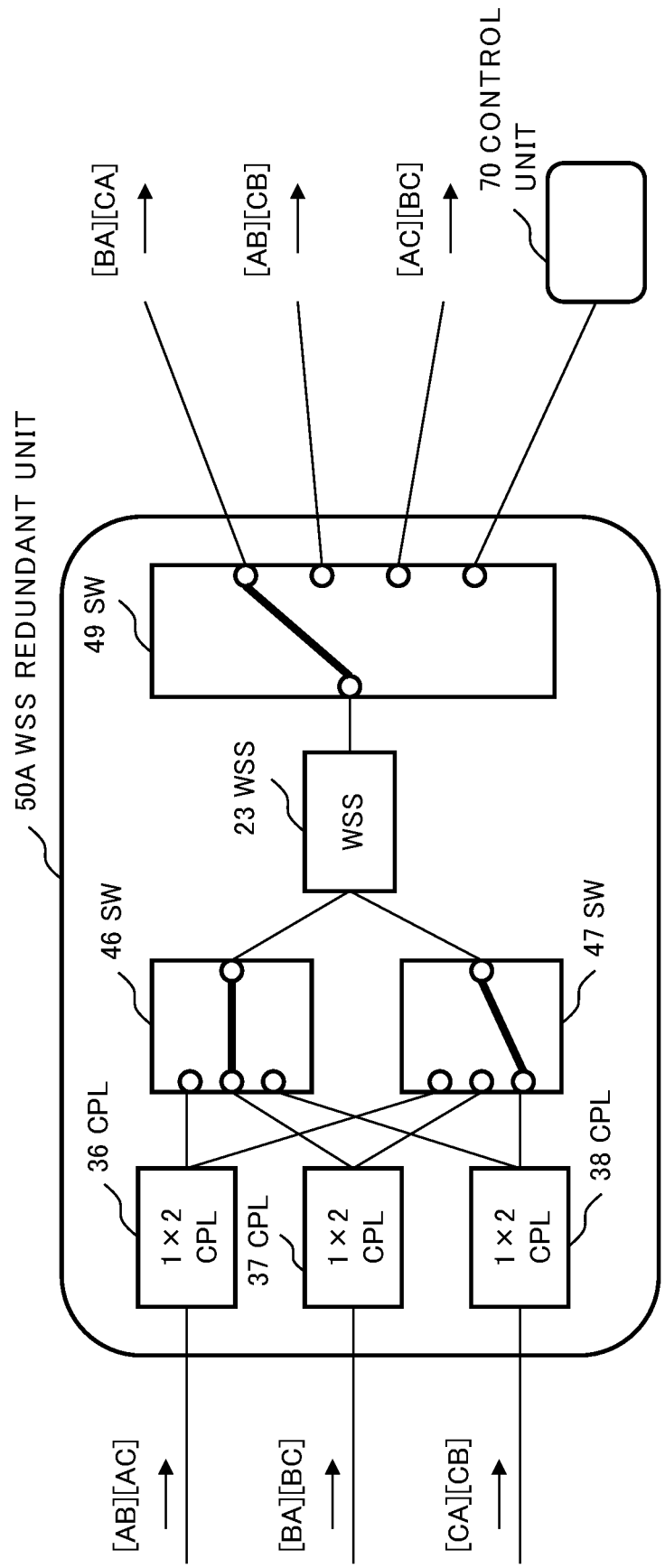
FIG. 13 is a diagram illustrating an example of a state of the WSS redundant unit 50A in the state in FIG. 12.

FIG. 12 illustrates an example of a state of the switches 43 to 45 in which the WSS 21 (a mark x) of the optical branching/coupling device 12 fails. FIG. 13 illustrates an example of a state of the WSS redundant unit 50A in which the optical branching/coupling device 12 is in the state in FIG. 12. Based on control of the control unit 70, the WSS redundant unit 50A generates, based on an optical signal [BA][BC] and an optical signal [CA][CB], an optical signal [BA][CA], and outputs the generated optical signal to the switch 44 in FIG. 12. Thereby, the optical branching/coupling device 12 can output, even when the WSS 21 fails, the optical signal [BA][CA] to the A terminal 1, similarly to a case where the WSS 21 does not fail.

(4) Case where WSS 22 Fails

Figure 14:
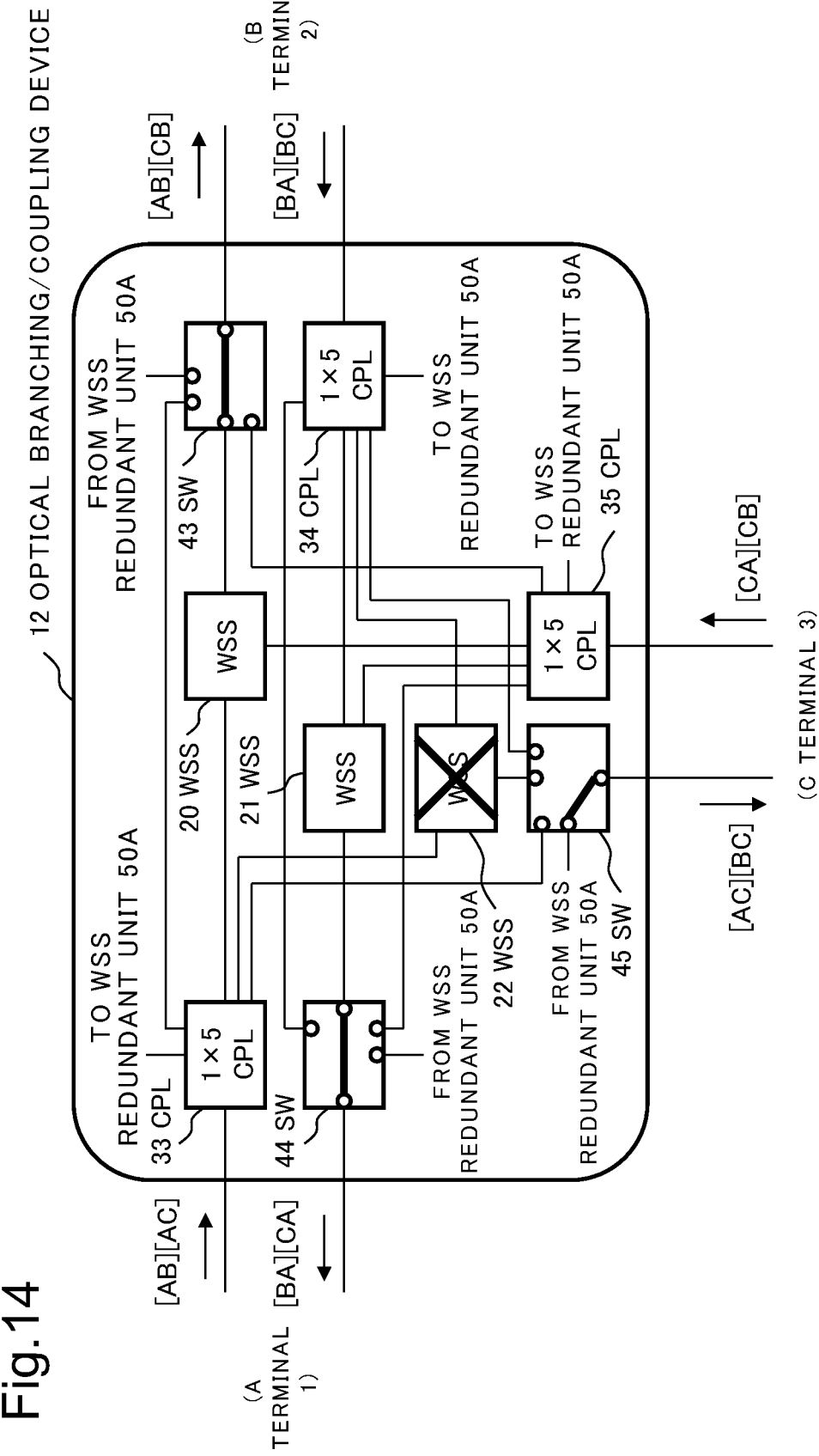
FIG. 14 is a diagram illustrating an example of a state of the switches 43 to 45 in which the WSS 22 fails.
Figure 15:
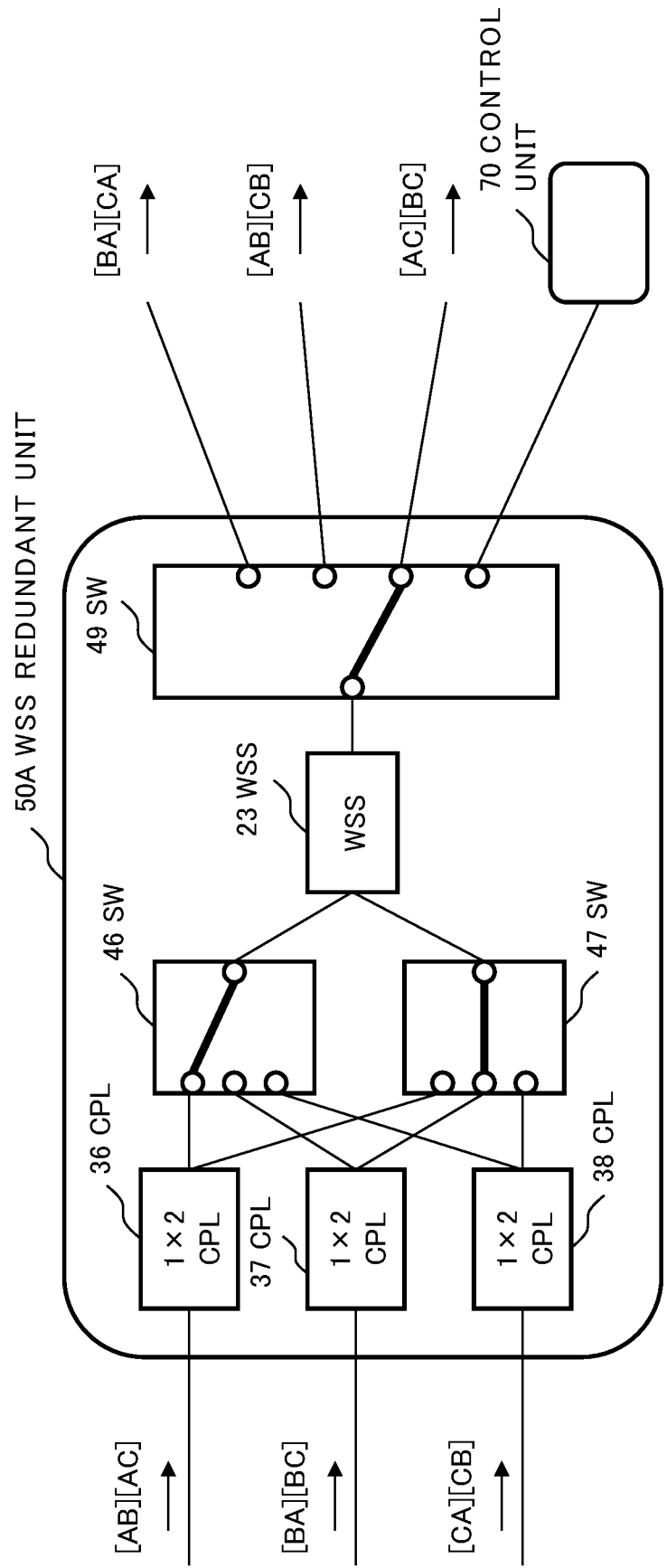
FIG. 15 is a diagram illustrating an example of a state of the WSS redundant unit 50A in the state in FIG. 14.

FIG. 14 illustrates an example of a state of the switches 43 to 45 in which the WSS 22 (a mark x) of the optical branching/coupling device 12 fails. FIG. 15 illustrates an example of a state of the WSS redundant unit 50A in which the optical branching/coupling device 12 is in the state in FIG. 14. Based on control of the control unit 70, the WSS redundant unit 50A generates, based on an optical signal [AB][AC] and an optical signal [BA][BC], an optical signal [AC][BC], and outputs the generated optical signal to the switch 45 in FIG. 14. Thereby, the optical branching/coupling device 12 can output, even when the WSS 22 fails, the optical signal [AC][BC] to the C terminal 1, similarly to a case where the WSS 22 does not fail.

(5) Case [1] where WSSs 20 and 21 Fail

Figure 16:
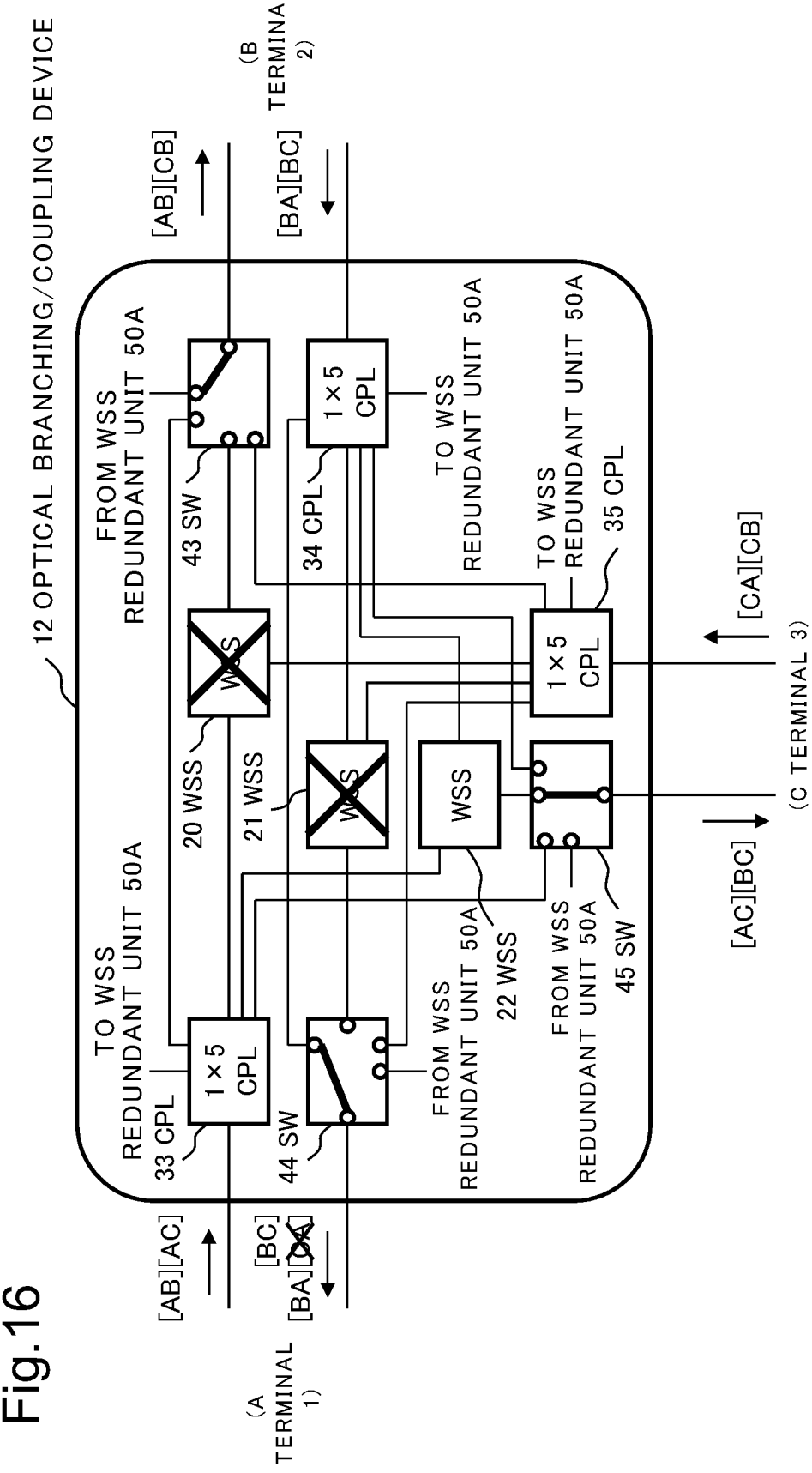
FIG. 16 is a diagram illustrating an example of a state of the switches 43 to 45 in which the WSSs 20 and 21 fail.

FIG. 16 illustrates an example of a state of the switches 43 to 45 in which the WSSs 20 and 21 (a mark x) of the optical branching/coupling device 12 fail. A state of the WSS redundant unit 50A in the state in FIG. 16 is similar to FIG. 11. In other words, based on control of the control unit 70, the WSS redundant unit 50A generates an optical signal [AB][CB] from an optical signal [AB][AC] and an optical signal [CA][CB], and outputs the generated optical signal to the switch 43 in FIG. 16. Thereby, the optical branching/coupling device 12 can output the optical signal [AB][CB] to the B terminal 2. In contrast, the WSS redundant unit 50A is used as a substitute for the WSS 20, and therefore, cannot substitute for a function of the WSS 21. Therefore, the control unit 70 controls the switch 44 in such a way as to directly output an optical signal [BA][BC] received from the B terminal 2 to the A terminal 1. Based on such control, bidirectional communication between the A terminal 1 and the B terminal 2 and bidirectional communication between the B terminal 2 and the C terminal 3 are maintained.

(6) Case [2] where WSSs 20 and 21 Fail

Figure 17:
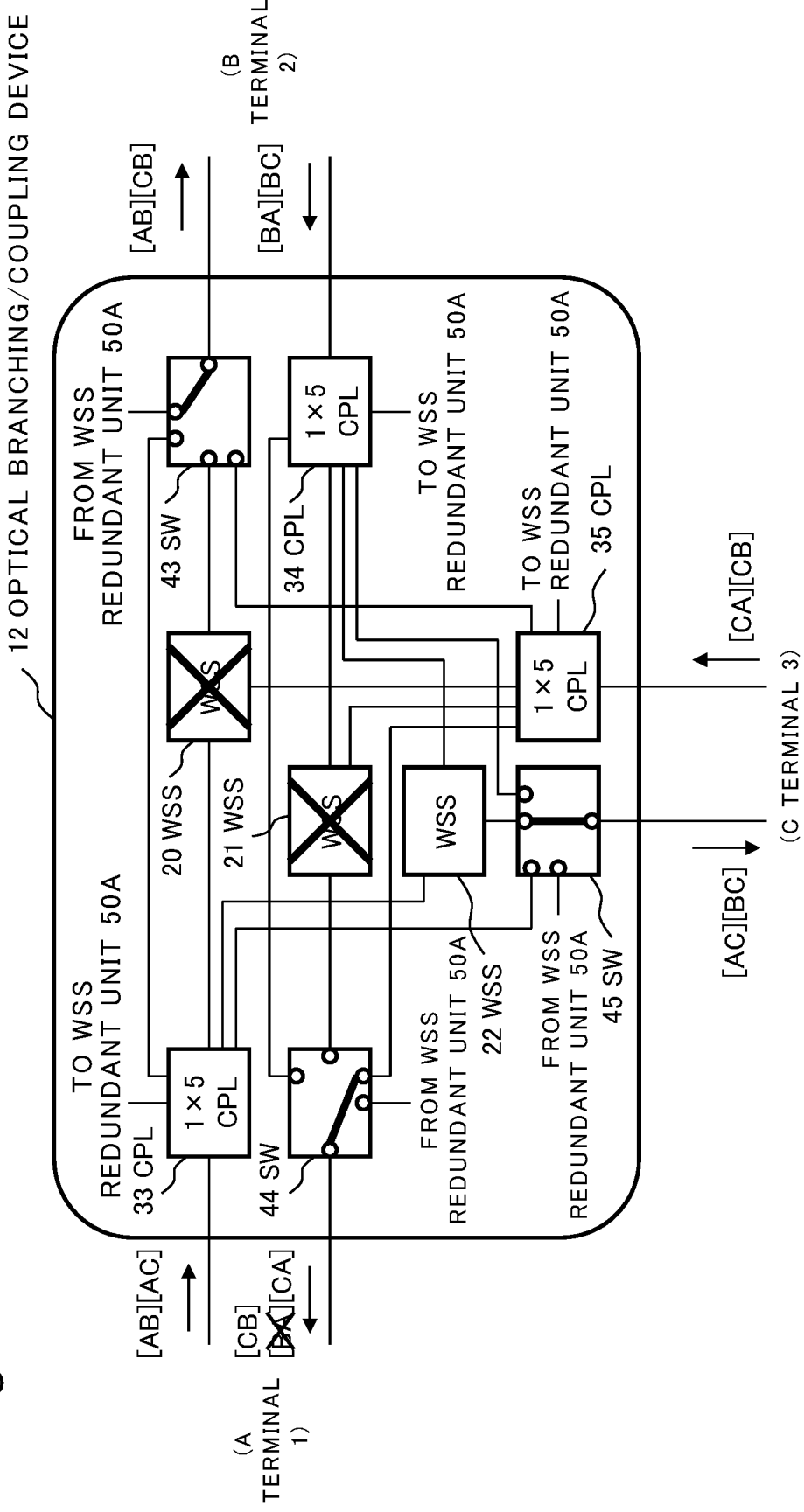
FIG. 17 is a diagram illustrating an example of another state of the switches 43 to 45 in which the WSSs 20 and 21 fail.

FIG. 17 illustrates an example of another state of the switches 43 to 45 in which the WSSs 20 and 21 (a mark x) of the optical branching/coupling device 12 fail. A state of the WSS redundant unit 50A in the state in FIG. 17 is similar to FIG. 11. In other words, based on control of the control unit 70, the WSS redundant unit 50A generates an optical signal [AB][CB], and outputs the generated optical signal to the switch 43 in FIG. 17. Thereby, the optical branching/coupling device 12 can output an optical signal [AC][BC] to the B terminal 2. In contrast, in FIG. 17, the control unit 70 controls the switch 44 in such a way as to directly output an optical signal [CA][CB] received from the C terminal 3 to the A terminal 1. Based on such control, bidirectional communication between the A terminal 1 and the C terminal 3 and bidirectional communication between the B terminal 2 and the C terminal 3 are maintained.

(7) Case [3] where WSSs 20 and 21 Fail

Figure 18:
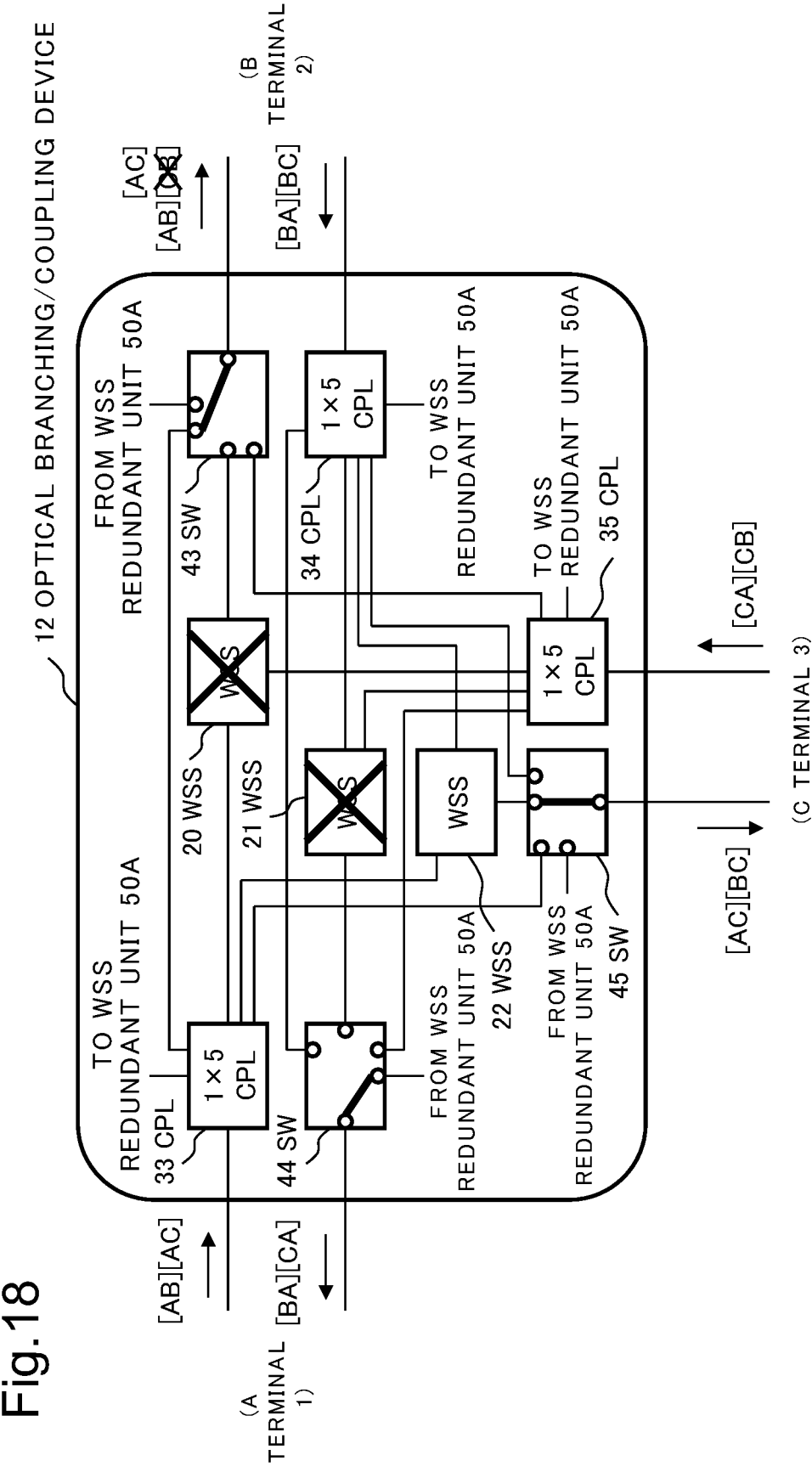
FIG. 18 is a diagram illustrating an example of another state of the switches 43 to 45 in which the WSSs 20 and 21 fail.

FIG. 18 illustrates an example of another state of the switches 43 to 45 in which the WSSs 20 and 21 (a mark x) of the optical branching/coupling device 12 fail. A state of the WSS redundant unit 50A in the state in FIG. 18 is similar to FIG. 13. In other words, based on control of the control unit 70, the WSS redundant unit 50A generates an optical signal [BA][CA], and outputs the generated optical signal to the switch 44 in FIG. 18. Thereby, the optical branching/coupling device 12 can output the optical signal [BA][CA] to the A terminal 1. In contrast, the WSS redundant unit 50A is used as a substitute for the WSS 21, and therefore, cannot substitute for a function of the WSS 20. Therefore, the control unit 70 controls the switch 43 in such a way as to directly output an optical signal [AB][AC] received from the A terminal 1 to the B terminal 2. Based on such control, bidirectional communication between the A terminal 1 and the B terminal 2 and bidirectional communication between the A terminal 1 and the C terminal 3 are maintained.

(8) Case [4] where WSSs 20 and 21 Fail

Figure 19:
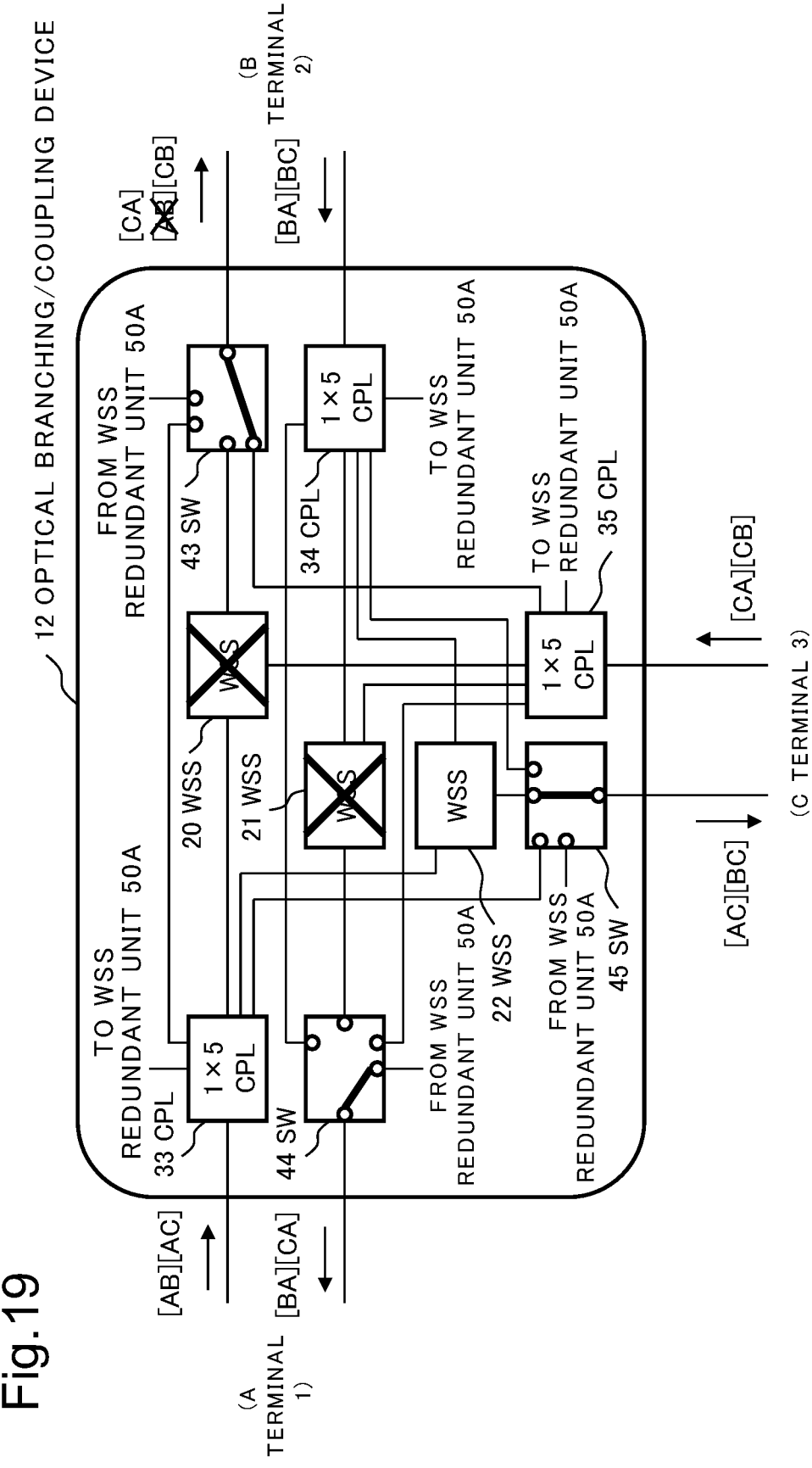
FIG. 19 is a diagram illustrating an example of another state of the switches 43 to 45 in which the WSSs 20 and 21 fail.

FIG. 19 illustrates an example of another state of the switches 43 to 45 in which the WSSs 20 and 21 (a mark x) of the optical branching/coupling device 12 fail. A state of the WSS redundant unit 50A in the state in FIG. 19 is similar to FIG. 13. In other words, based on control of the control unit 70, the WSS redundant unit 50A generates an optical signal [BA][CA], and outputs the generated optical signal to the switch 44 in FIG. 21. Thereby, the optical branching/coupling device 12 can output the optical signal [BA][CA] to the A terminal 1. In contrast, in FIG. 19, the control unit 70 controls the switch 43 in such a way as to directly output an optical signal [CA][CB] received from the C terminal 3 to the B terminal 2. Based on such control, bidirectional communication between the A terminal 1 and the C terminal 3 and bidirectional communication between the B terminal 2 and the C terminal 3 are maintained.

(9) Case [1] where WSSs 20 and 22 Fail

Figure 20:
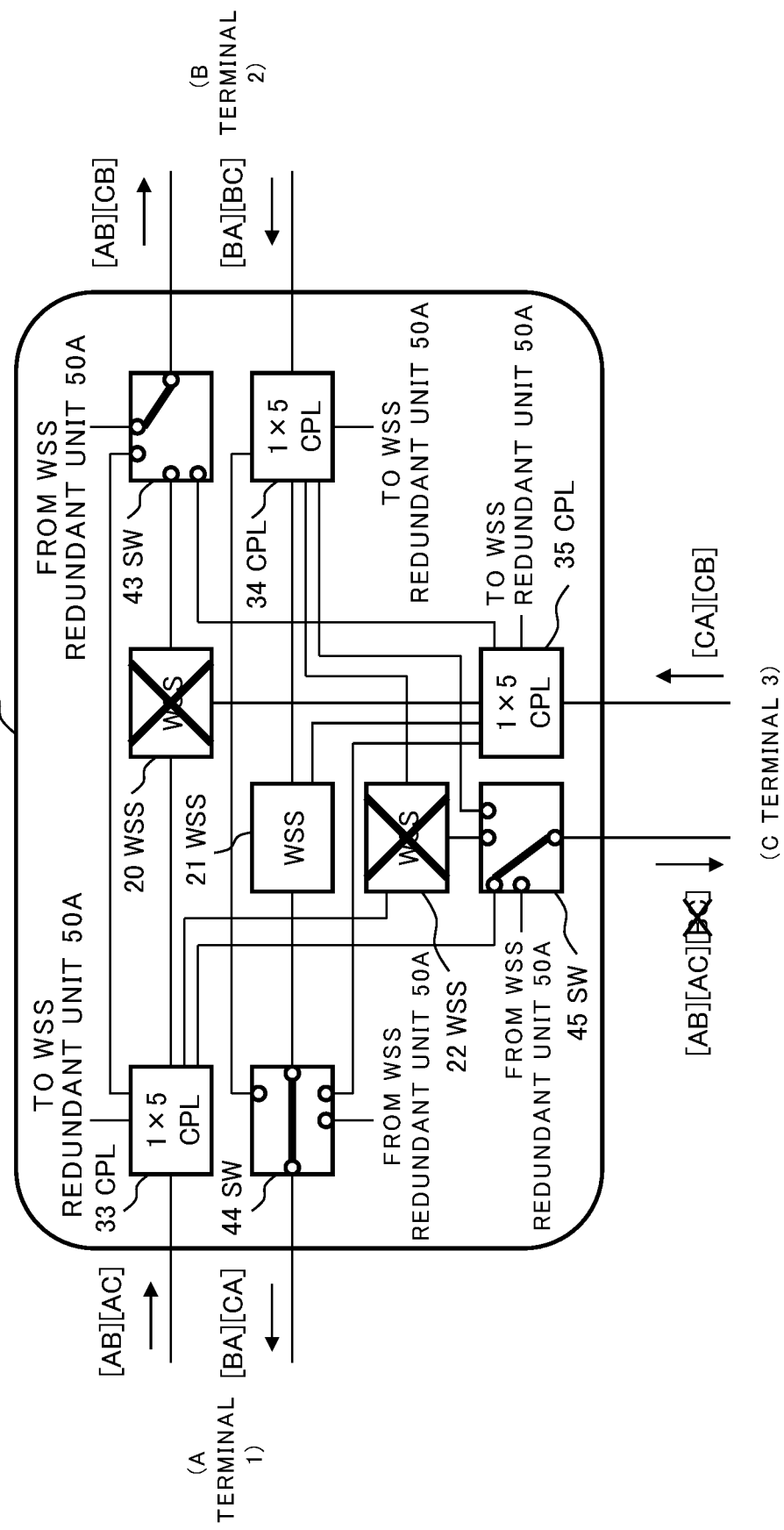
FIG. 20 is a diagram illustrating an example of a state of the switches 43 to 45 in which the WSSs 20 and 22 fail.

FIG. 20 illustrates an example of a state of the switches 43 to 45 in which the WSSs 20 and 22 (a mark x) of the optical branching/coupling device 12 fail. A state of the WSS redundant unit 50A in the state in FIG. 20 is similar to FIG. 11. In other words, based on control of the control unit 70, the WSS redundant unit 50A generates an optical signal [AB][CB], and outputs the generated optical signal to the switch 43 in FIG. 20. Thereby, the optical branching/coupling device 12 can output the optical signal [AB][CB] to the B terminal 2. In contrast, in FIG. 20, the control unit 70 controls the switch 45 in such a way as to directly output an optical signal [AB][AC] received from the A terminal 1 to the C terminal 3. Based on such control, bidirectional communication between the A terminal 1 and the B terminal 2 and bidirectional communication between the A terminal 1 and the C terminal 3 are maintained.

(10) Case [2] where WSSs 20 and 22 Fail

Figure 21:
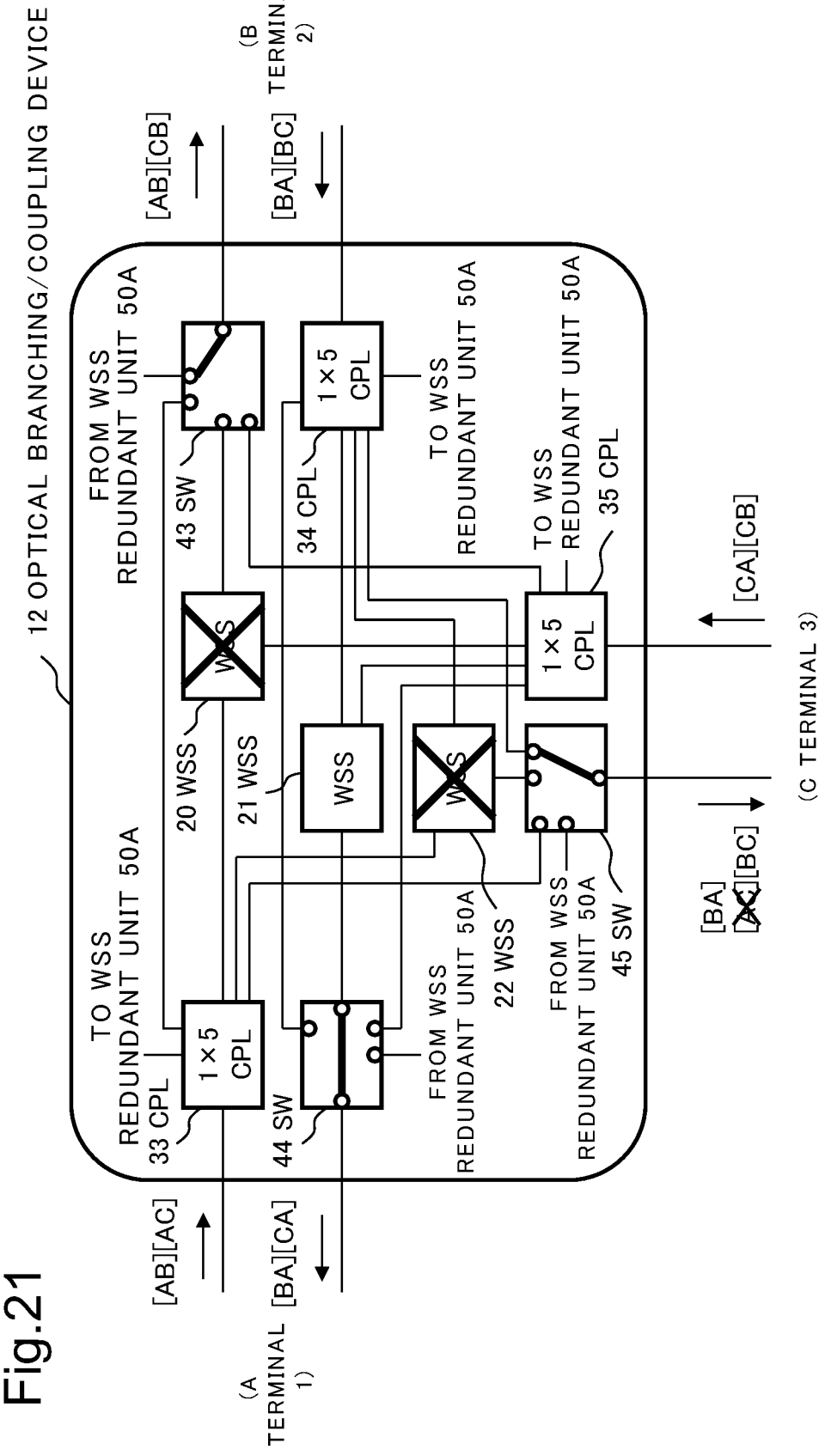
FIG. 21 is a diagram illustrating an example of another state of the switches 43 to 45 in which the WSSs 20 and 22 fail.

FIG. 21 illustrates an example of another state of the switches 43 to in which the WSSs 20 and 22 (a mark x) of the optical branching/coupling device 12 fail. A state of the WSS redundant unit 50A in the state in FIG. 21 is similar to FIG. 11. In other words, based on control of the control unit 70, the WSS redundant unit 50A generates an optical signal [AB][CB], and outputs the generated optical signal to the switch 43 in FIG. 22. Thereby, the optical branching/coupling device 12 can output the optical signal [AB][CB] to the B terminal 2. In contrast, in FIG. 21, the control unit 70 controls the switch 45 in such a way as to directly output an optical signal [BA][BC] received from the B terminal 2 to the C terminal 3. Based on such control, bidirectional communication between the A terminal 1 and the B terminal 2 and bidirectional communication between the B terminal 2 and the C terminal 3 are maintained.

(11) Case [3] where WSSs 20 and 22 Fail

Figure 22:
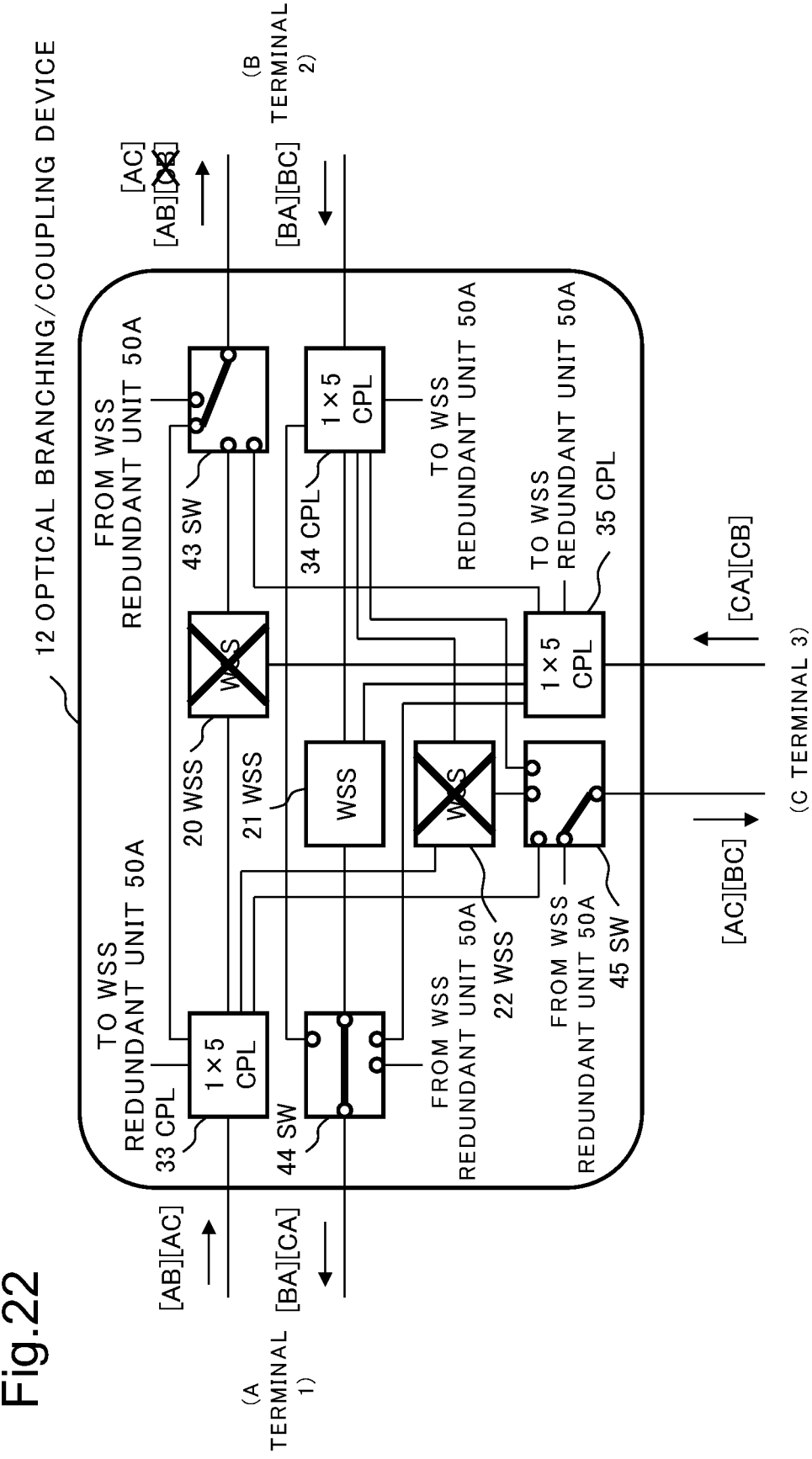
FIG. 22 is a diagram illustrating an example of another state of the switches 43 to 45 in which the WSSs 20 and 22 fail.

FIG. 22 illustrates an example of another state of the switches 43 to in which the WSSs 20 and 22 (a mark x) of the optical branching/coupling device 12 fail. A state of the WSS redundant unit 50A in the state in FIG. 22 is similar to FIG. 15. In other words, based on control of the control unit 70, the WSS redundant unit 50A generates an optical signal [AC][BC], and outputs the generated optical signal to the switch 45 in FIG. 22. Thereby, the optical branching/coupling device 12 can output the optical signal [AC][BC] to the C terminal 3. In contrast, in FIG. 22, the control unit 70 controls the switch 43 in such a way as to directly output an optical signal [AB][AC] received from the A terminal 1 to the B terminal 2. Based on such control, bidirectional communication between the A terminal 1 and the C terminal 3 and bidirectional communication between the A terminal 1 and the B terminal 2 are maintained.

(12) Case [4] where WSSs 20 and 22 Fail

Figure 23:
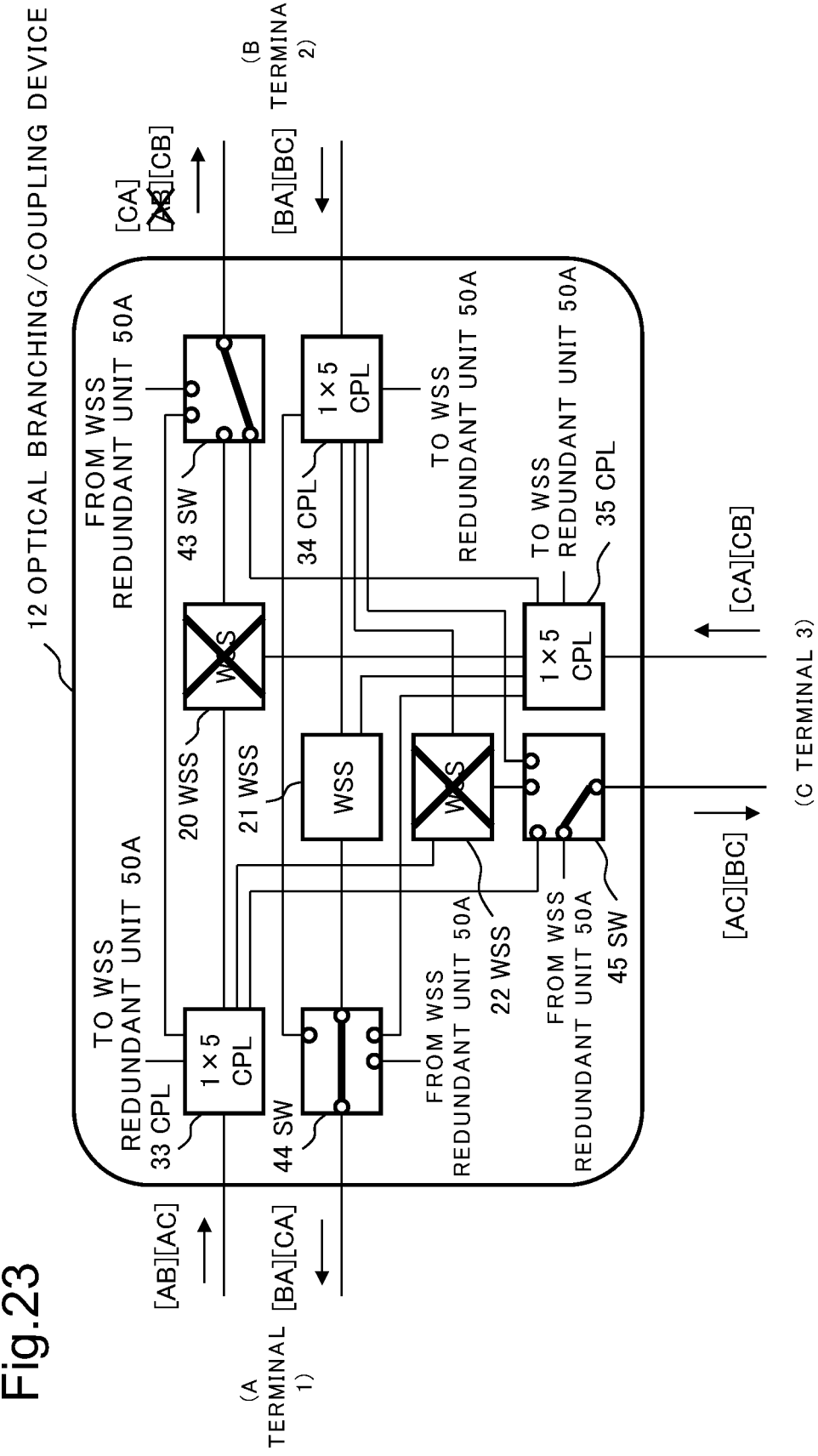
FIG. 23 is a diagram illustrating an example of another state of the switches 43 to 45 in which the WSSs 20 and 22 fail.

FIG. 23 illustrates an example of another state of the switches 43 to in which the WSSs 20 and 22 (a mark x) of the optical branching/coupling device 12 fail. A state of the WSS redundant unit 50A in the state in FIG. 23 is similar to FIG. 15. In other words, based on control of the control unit 70, the WSS redundant unit 50A generates an optical signal [AC][BC], and outputs the generated optical signal to the switch 45 in FIG. 23. Thereby, the optical branching/coupling device 12 can output the optical signal [AC][BC] to the C terminal 3. In contrast, in FIG. 23, the control unit 70 controls the switch 43 in such a way as to directly output an optical signal [CA][CB] received from the C terminal 3 to the B terminal 2. Based on such control, bidirectional communication between the A terminal 1 and the C terminal 3 and bidirectional communication between the B terminal 2 and the C terminal 3 are maintained.

(13) Case [1] where WSSs 21 and 22 Fail

Figure 24:
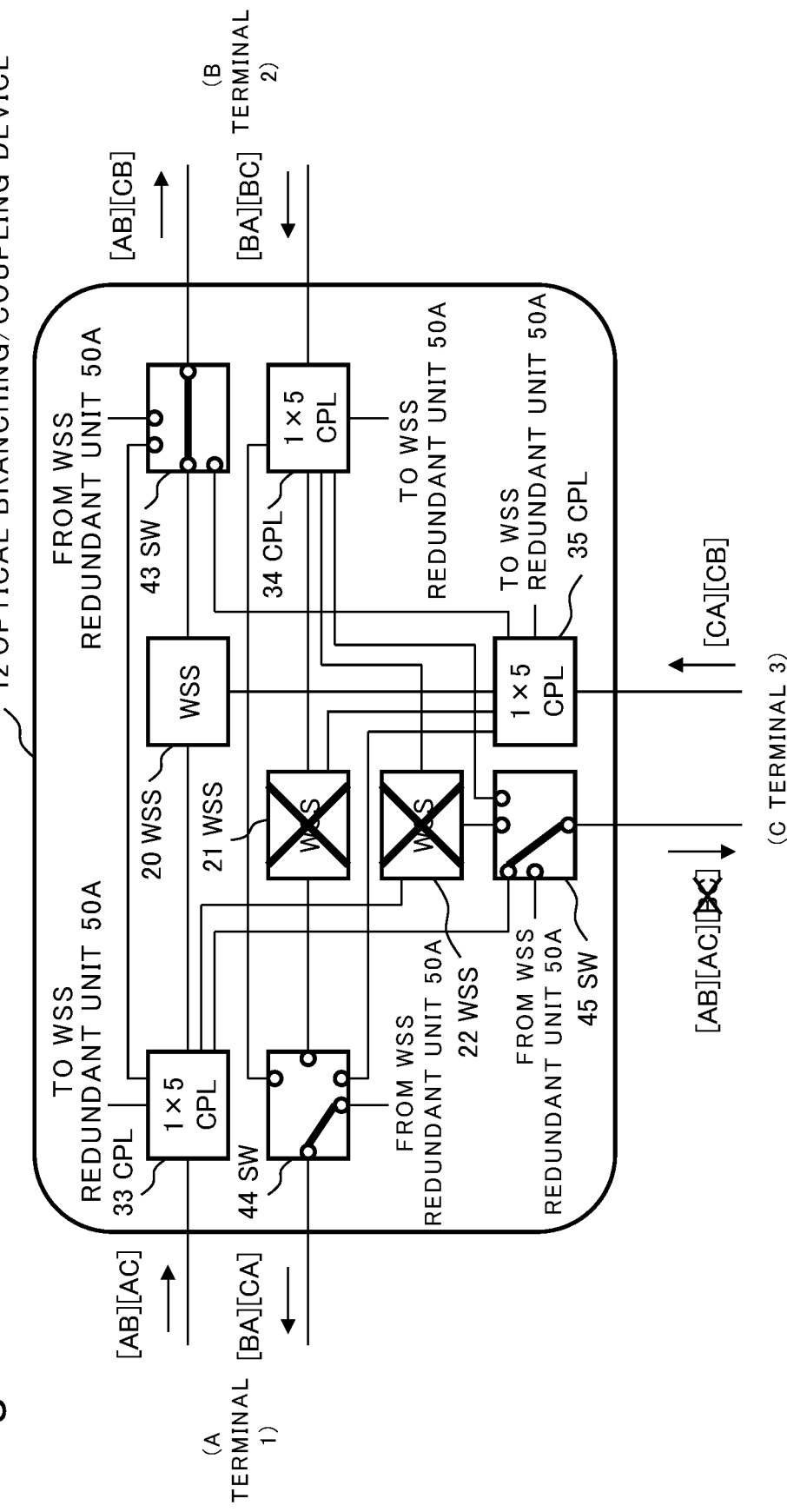
FIG. 24 is a diagram illustrating an example of a state of the switches 43 to 45 in which the WSSs 21 and 22 fail.

FIG. 24 illustrates an example of a state of the switches 43 to 45 in which the WSSs 21 and 22 (a mark x) of the optical branching/coupling device 12 fail. A state of the WSS redundant unit 50A in the state in FIG. 24 is similar to FIG. 13. In other words, based on control of the control unit 70, the WSS redundant unit 50A generates an optical signal [BA][CA], and outputs the generated optical signal to the switch 44 in FIG. 24. Thereby, the optical branching/coupling device 12 can output the optical signal [BA][CA] to the A terminal 1. In contrast, in FIG. 24, the control unit 70 controls the switch 45 in such a way as to directly output an optical signal [AB][AC] received from the A terminal 1 to the C terminal 3. Based on such control, bidirectional communication between the A terminal 1 and the B terminal 2 and bidirectional communication between the A terminal 1 and the C terminal 3 are maintained.

(14) Case [2] where WSSs 21 and 22 Fail

Figure 25:
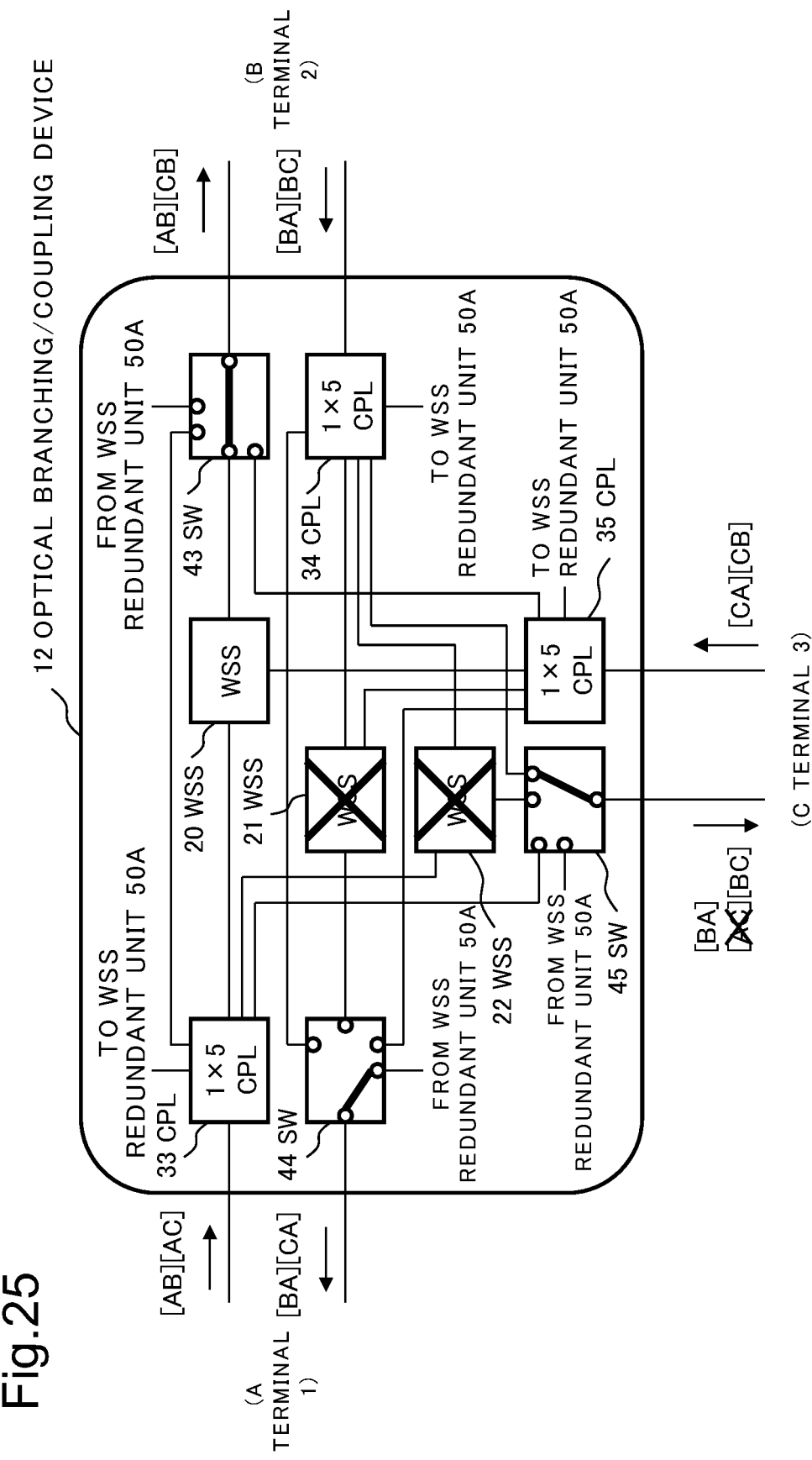
FIG. 25 is a diagram illustrating an example of another state of the switches 43 to 45 in which the WSSs 21 and 22 fail.

FIG. 25 illustrates an example of another state of the switches 43 to in which the WSSs 21 and 22 (a mark x) of the optical branching/coupling device 12 fail. A state of the WSS redundant unit 50A in the state in FIG. 25 is similar to FIG. 13. In other words, based on control of the control unit 70, the WSS redundant unit 50A generates an optical signal [BA][CA], and outputs the generated optical signal to the switch 44 in FIG. 25. Thereby, the optical branching/coupling device 12 can output the optical signal [BA][CA] to the A terminal 1. In contrast, in FIG. 25, the control unit 70 controls the switch 45 in such a way as to directly output an optical signal [BA][BC] received from the B terminal 2 to the C terminal 3. Based on such control, bidirectional communication between the A terminal 1 and the B terminal 2 and bidirectional communication between the B terminal 2 and the C terminal 3 are maintained.

(15) Case [3] where WSSs 21 and 22 Fail

Figure 26:
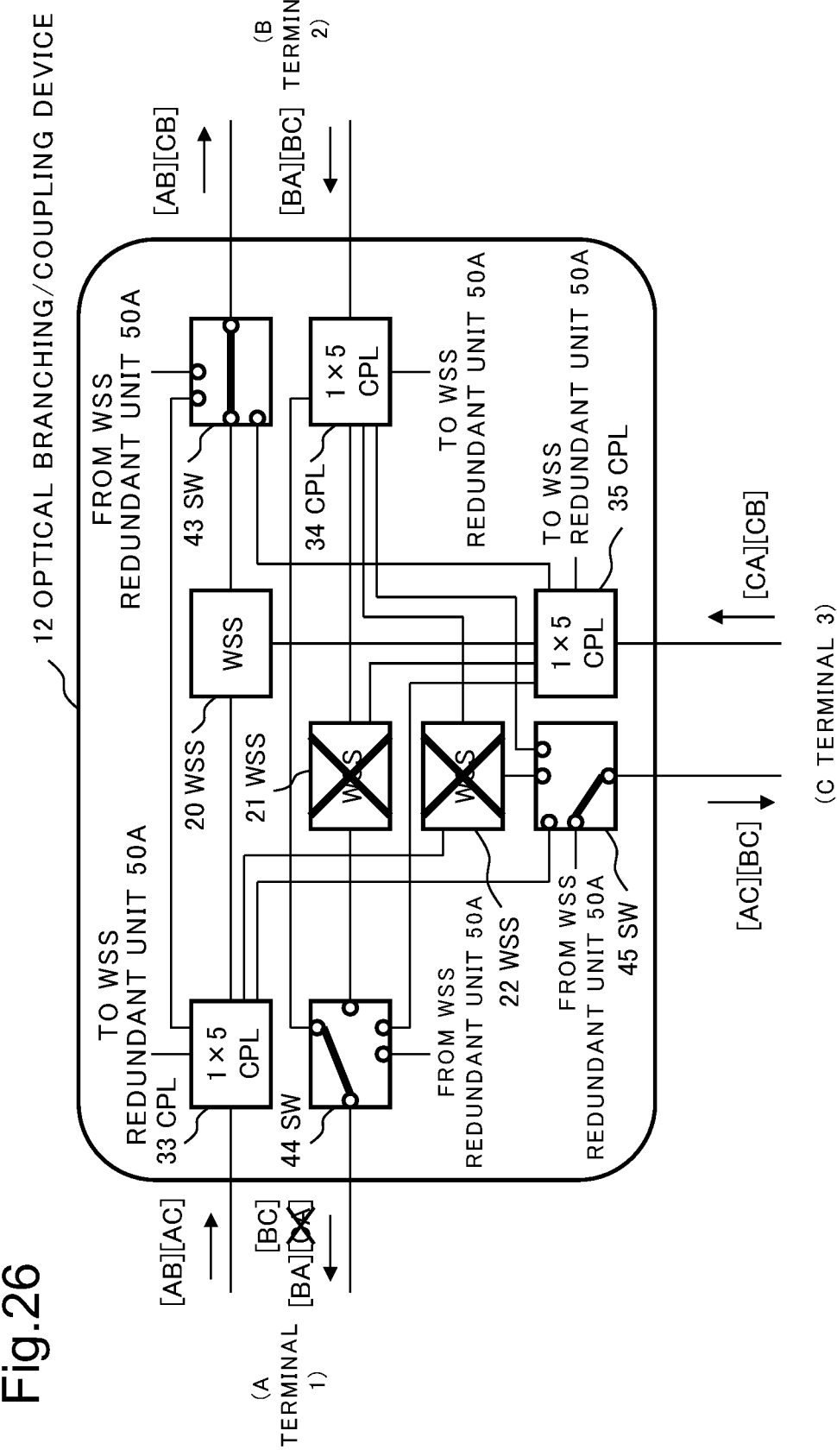
FIG. 26 is a diagram illustrating an example of another state of the switches 43 to 45 in which the WSSs 21 and 22 fail.

FIG. 26 illustrates an example of another state of the switches 43 to 45 in which the WSSs 21 and 22 (a mark x) of the optical branching/coupling device 12 fail. A state of the WSS redundant unit 50A in the state in FIG. 26 is similar to FIG. 15. In other words, based on control of the control unit 70, the WSS redundant unit 50A generates an optical signal [AC][BC], and outputs the generated optical signal to the switch 45 in FIG. 26. Thereby, the optical branching/coupling device 12 can output the optical signal [AC][BC] to the C terminal 3. In contrast, in FIG. 26, the control unit 70 controls the switch 44 in such a way as to directly output an optical signal [BA][BC] received from the B terminal 2 to the A terminal 1. Based on such control, bidirectional communication between the A terminal 1 and the B terminal 2 and bidirectional communication between the B terminal 1 and the C terminal 3 are maintained.

(16) Case [4] where WSSs 21 and 22 Fail

Figure 27:
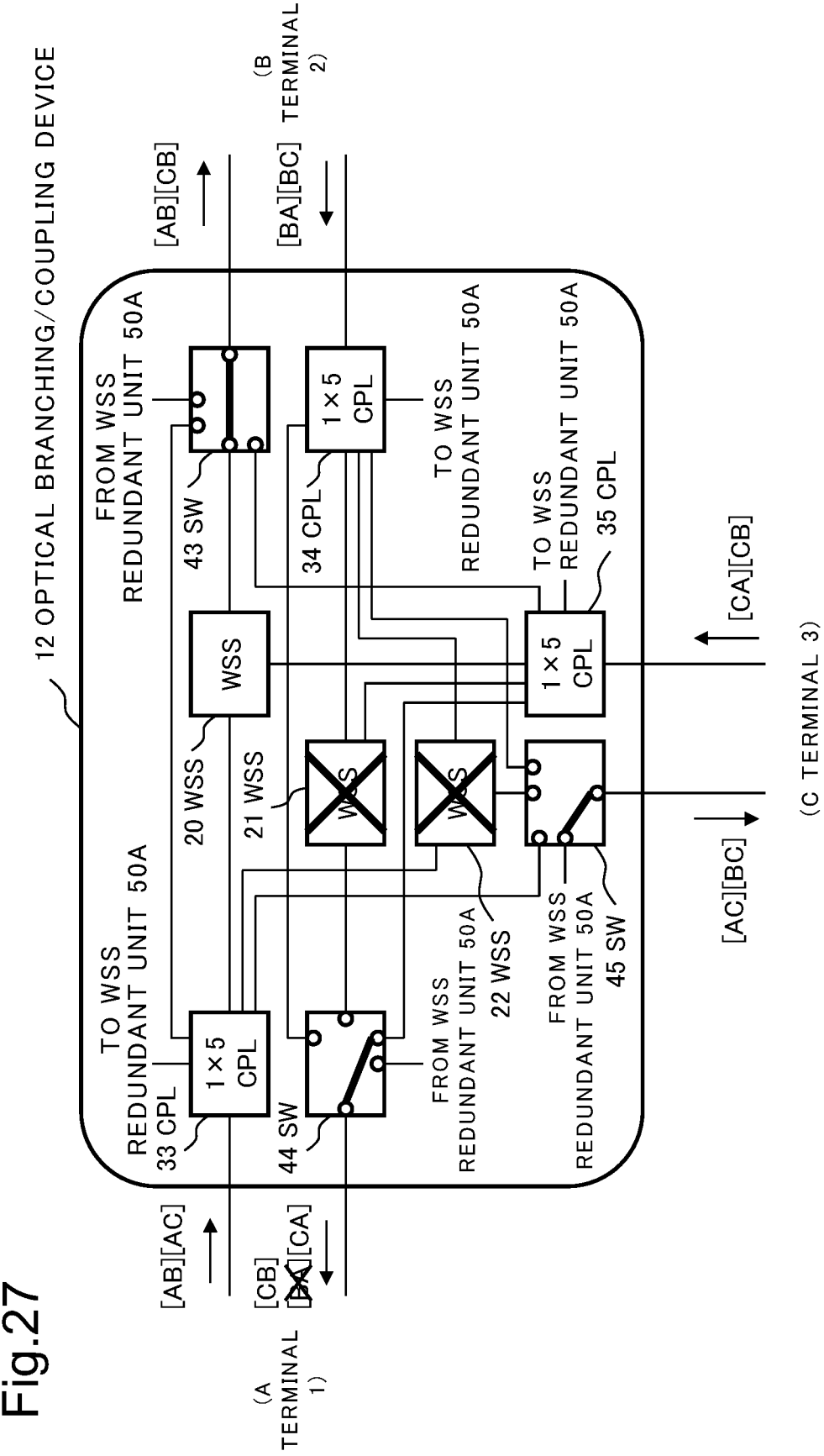
FIG. 27 is a diagram illustrating an example of another state of the switches 43 to 45 in which the WSSs 21 and 22 fail.

FIG. 27 illustrates an example of another state of the switches 43 to in which the WSSs 21 and 22 (a mark x) of the optical branching/coupling device 12 fail. A state of the WSS redundant unit 50A in the state in FIG. 27 is similar to FIG. 15. In other words, based on control of the control unit 70, the WSS redundant unit 50A generates an optical signal [AC][BC], and outputs the generated optical signal to the switch 45 in FIG. 27. Thereby, the optical branching/coupling device 12 can output the optical signal [AC][BC] to the C terminal 3. In contrast, in FIG. 27, the control unit 70 controls the switch 44 in such a way as to directly output an optical signal [CA][CB] received from the C terminal 3 to the A terminal 1. Based on such control, bidirectional communication between the A terminal 1 and the C terminal 3 and bidirectional communication between the B terminal 1 and the C terminal 3 are maintained.

As described above, an operation of the optical branching/coupling device 12 in which two WSSs or one WSS of three WSSs being the WSSs 20 to 22 fails has been described. When two WSSs fail, it may be determined, based on a degree of importance of a WSS having failed and communication, which of the above-described operations in FIGS. 16 to 27 is performed by the optical branching/coupling device 12. When, for example, one or two WSSs fail, a state in which bidirectional communication having a higher degree of importance is preferentially maintained is selected. The control unit 70 may control, based on an instruction received through a monitoring control line from any one of the terminals 1 to 3, an operation of the optical branching/coupling device 12.

(17) Case [1] where WSSs 21 to 23 Fail

FIGS. 28 to 33 each illustrate an example of a state of the switches 43 to 45 in which the WSSs 21, 22, and t23 (a mark x) of the optical branching/coupling device 12 fail. In the states in FIGS. 28 to 33, output of the WSS redundant unit 50A is not output to the terminals 1 to 3. Therefore, in these cases, a state of the WSS redundant unit 50A is optional. The WSS redundant unit 50A may monitor, based on optical signals received from the terminals 1 to 3, an optical signal generated by the WSS 23.

Figure 28:
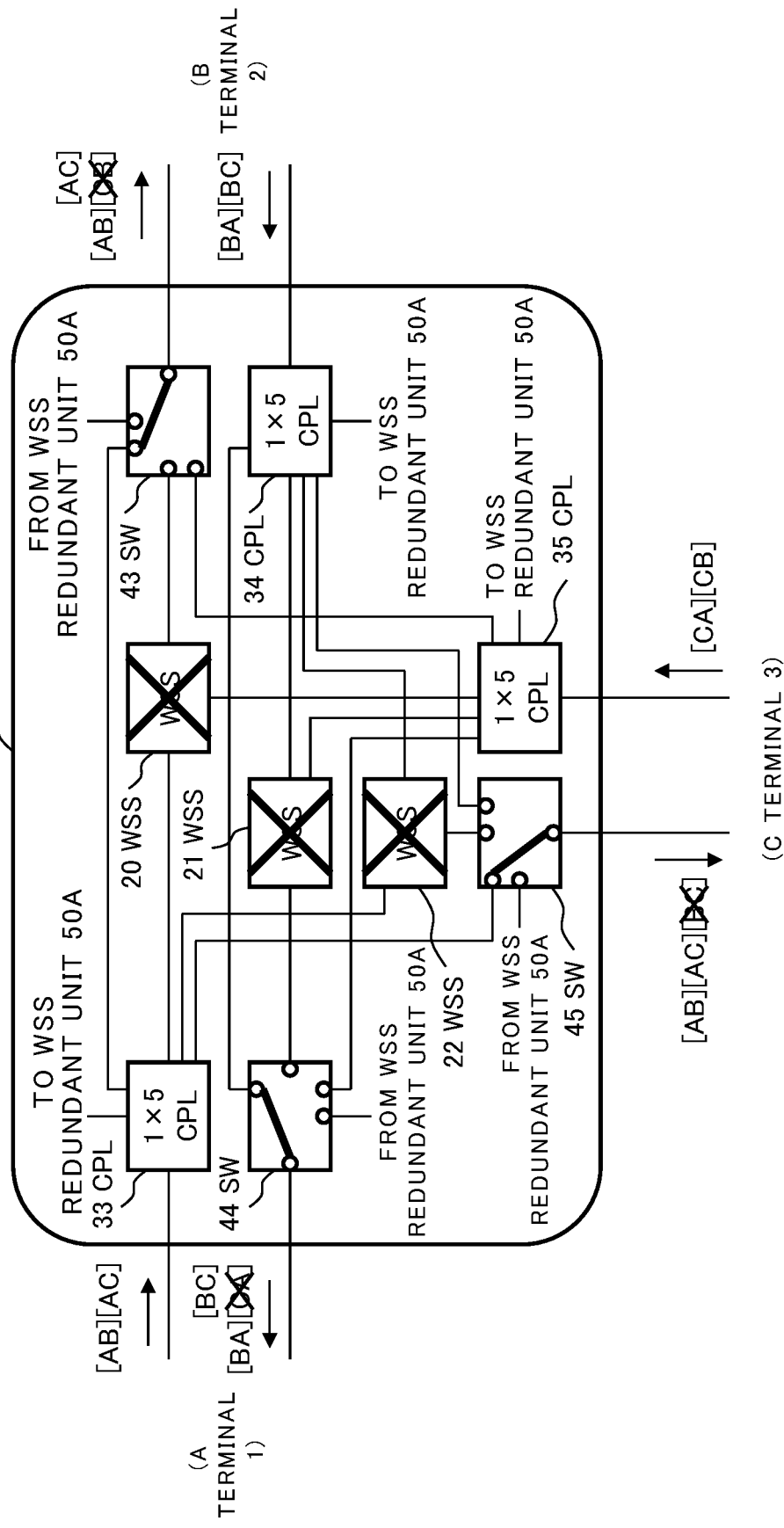
FIG. 28 is a diagram illustrating an example of a state of the switches 43 to 45 in which the WSSs 21 to 23 fail.

In FIG. 28, the control unit 70 controls the switch 43 and the switch 45 in such a way as to directly output an optical signal [AB][AC] received from the A terminal 1 to the B terminal 2 and the C terminal 3. The control unit 70 controls the switch 44 in such a way as to directly output an optical signal [BA][BC] received from the B terminal 2 to the A terminal 1. As a result, the optical branching/coupling device 12 in FIG. 28 can maintain, even when the WSSs 20 to 22 fail, bidirectional communication between the A terminal 1 and the B terminal 2.

(18) Case [2] where WSSs 21 to 23 Fail

Figure 29:
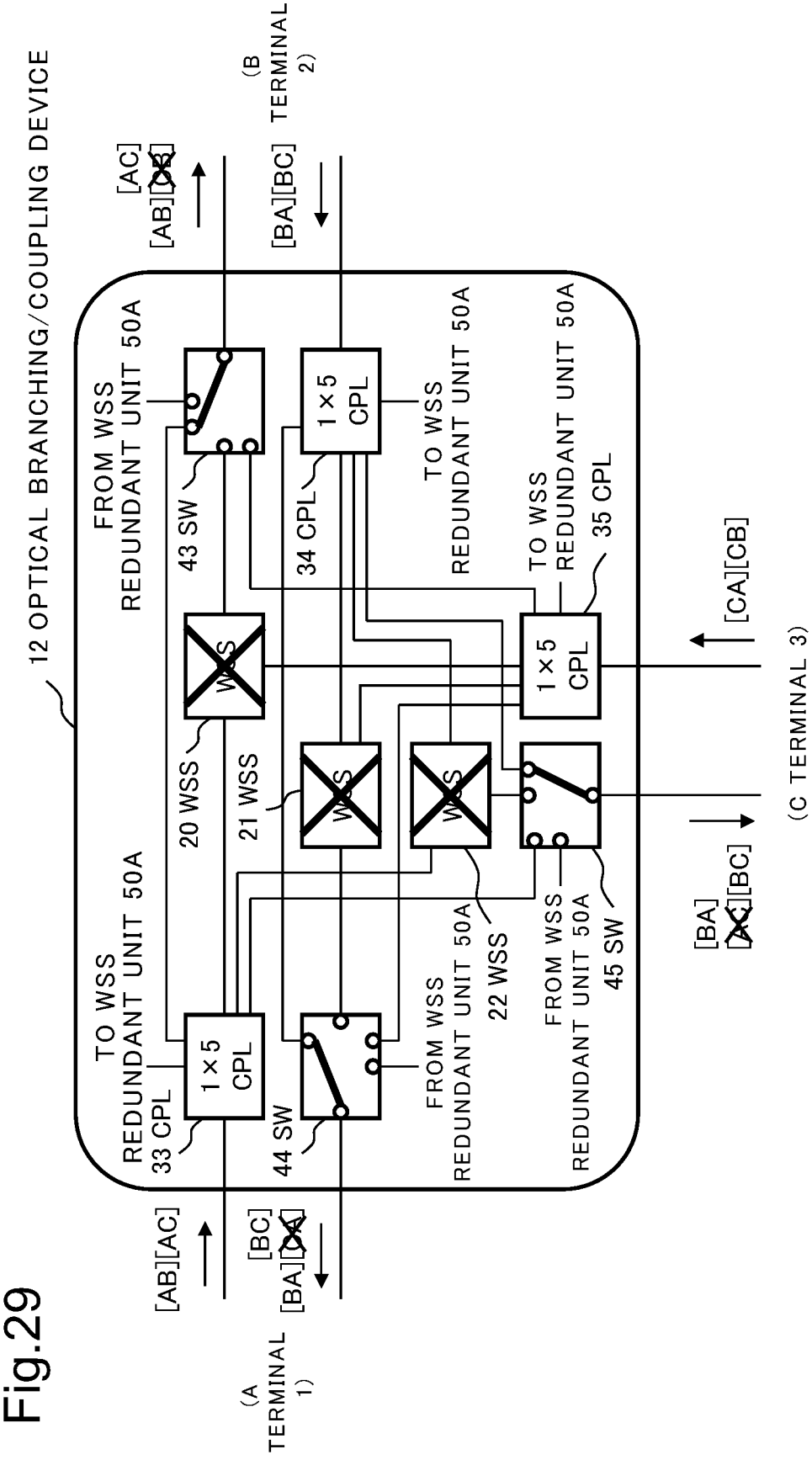
FIG. 29 is a diagram illustrating an example of another state of the switches 43 to 45 in which the WSSs 21 to 23 fail.

FIG. 29 illustrates an example of another state of the switches 43 to in which the WSSs 21, 22, and 23 (a mark x) of the optical branching/coupling device 12 fail.

In FIG. 29, the control unit 70 controls the switch 44 and the switch 45 in such a way as to directly output an optical signal [BA][BC] received from the B terminal 2 to the A terminal 1 and the C terminal 3. The control unit 70 controls the switch 43 in such a way as to directly output an optical signal [AB][AC] received from the A terminal 1 to the B terminal 2. As a result, the optical branching/coupling device 12 in FIG. 29 can maintain, even when the WSSs 20 to 22 fail, bidirectional communication between the A terminal 1 and the B terminal 2.

(19) Case [3] where WSSs 21 to 23 Fail

Figure 30:
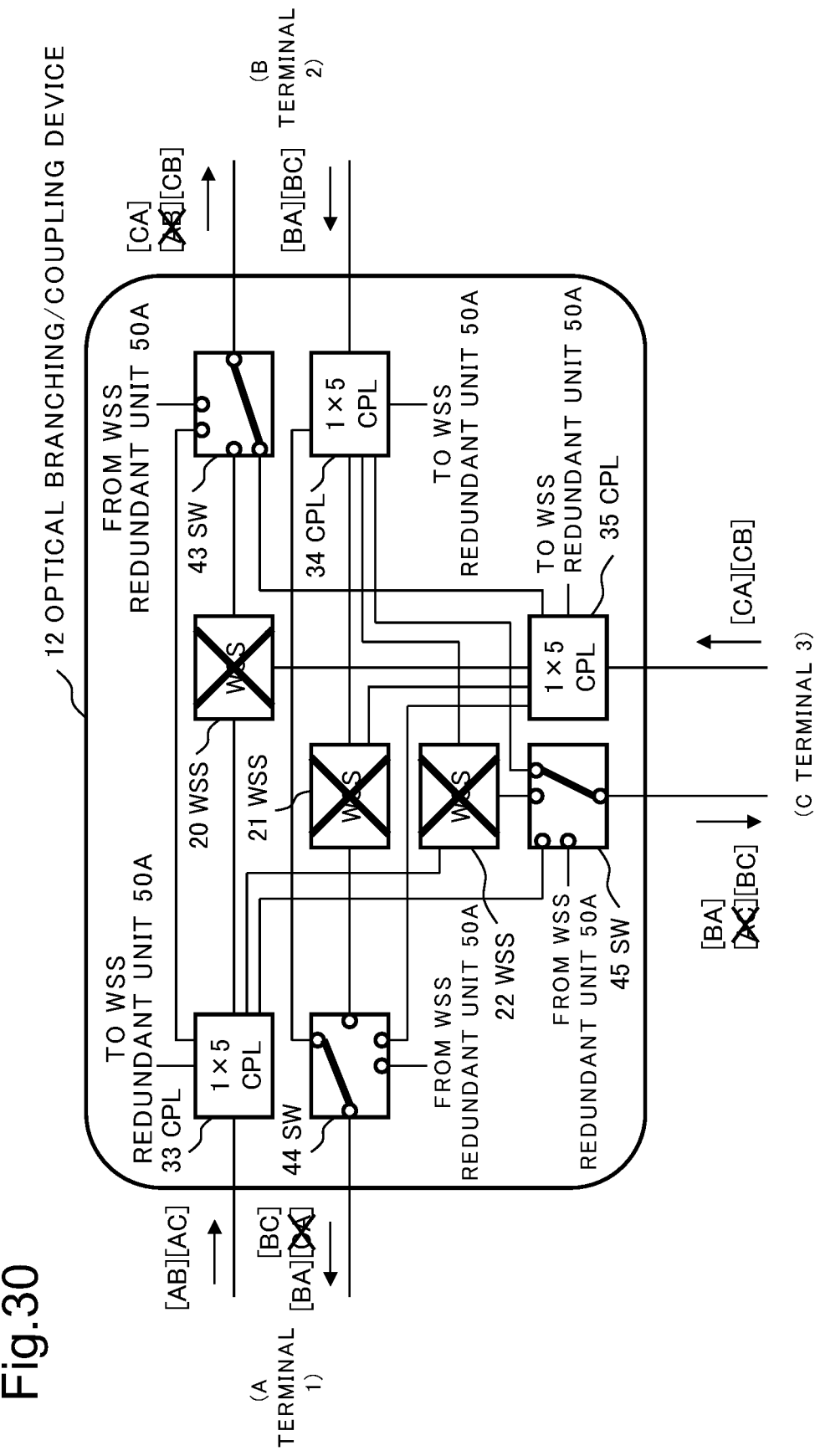
FIG. 30 is a diagram illustrating an example of another state of the switches 43 to 45 in which the WSSs 21 to 23 fail.

FIG. 30 illustrates an example of another state of the switches 43 to in which the WSSs 21, 22, and 23 (a mark x) of the optical branching/coupling device 12 fail.

In FIG. 30, the control unit 70 controls the switch 44 and the switch 45 in such a way as to directly output an optical signal [BA][BC] received from the B terminal 2 to the A terminal 1 and the C terminal 3. The control unit 70 controls the switch 43 in such a way as to directly output an optical signal [CA][CB] received from the C terminal 3 to the B terminal 2. As a result, the optical branching/coupling device 12 in FIG. can maintain, even when the WSSs 20 to 22 fail, bidirectional communication between the B terminal 2 and the C terminal 3.

(20) Case [4] where WSSs 21 to 23 Fail

Figure 31:
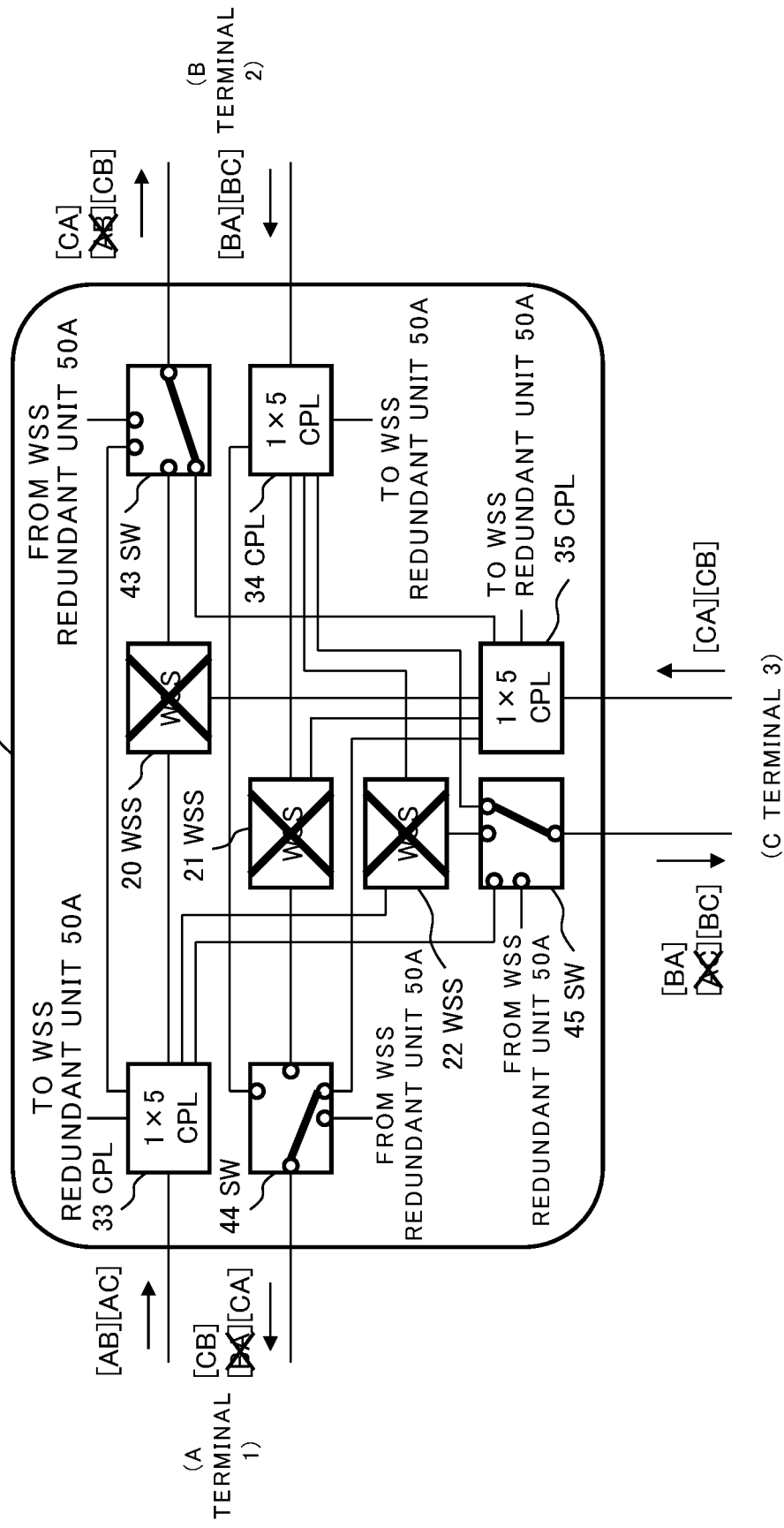
FIG. 31 is a diagram illustrating an example of another state of the switches 43 to 45 in which the WSSs 21 to 23 fail.

FIG. 31 illustrates an example of another state of the switches 43 to in which the WSSs 21, 22, and 23 (a mark x) of the optical branching/coupling device 12 fail.

In FIG. 31, the control unit 70 controls the switch 43 and the switch 44 in such a way as to directly output an optical signal [CA][CB] received from the C terminal 3 to the A terminal 1 and the B terminal 2. The control unit 70 controls the switch 45 in such a way as to directly output an optical signal [BA][BC] received from the B terminal 2 to the C terminal 3. As a result, the optical branching/coupling device 12 in FIG. 31 can maintain, even when the WSSs 20 to 22 fail, bidirectional communication between the B terminal 2 and the C terminal 3.

(21) Case [5] where WSSs 21 to 23 Fail

Figure 32:
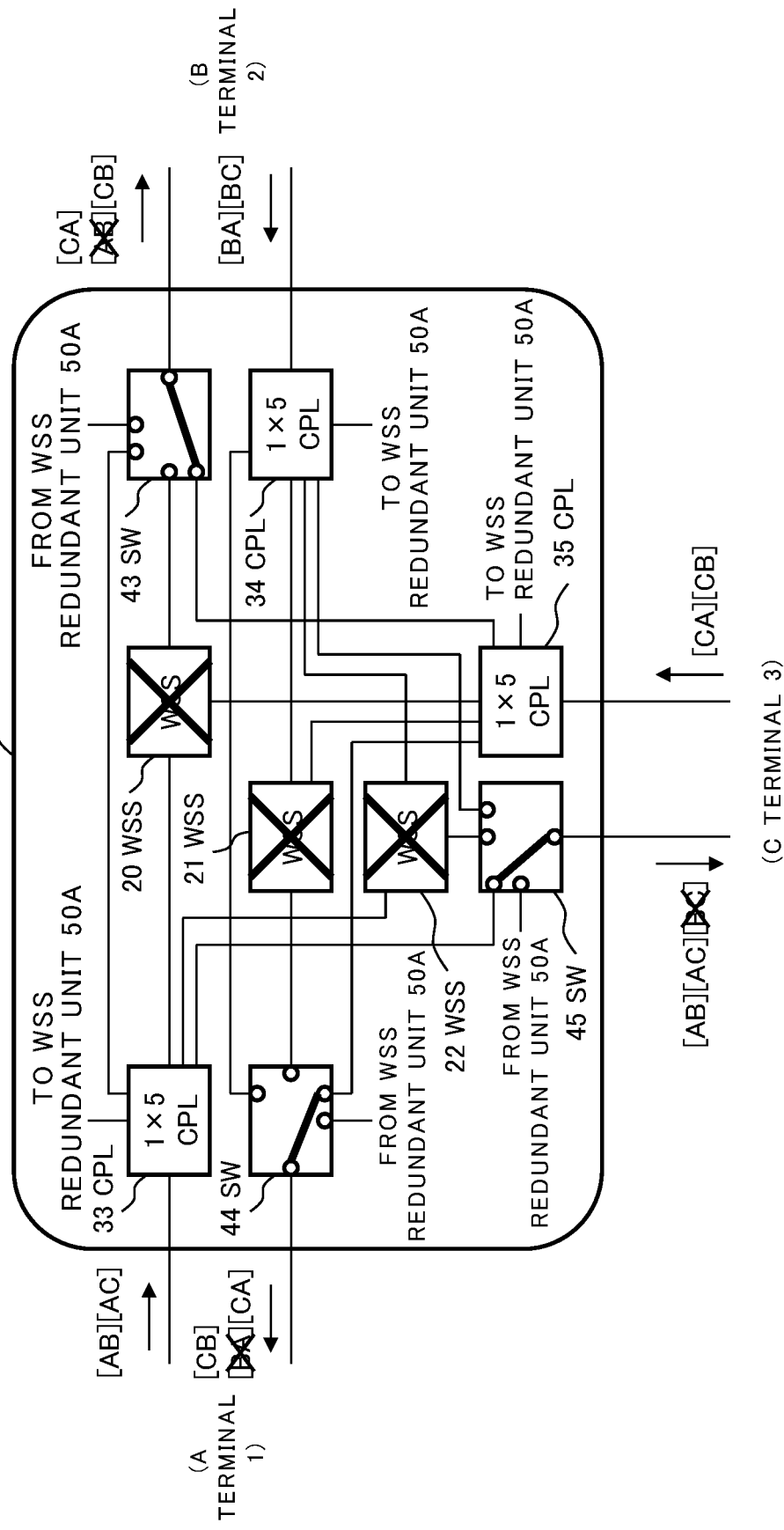
FIG. 32 is a diagram illustrating an example of another state of the switches 43 to 45 in which the WSSs 21 to 23 fail.

FIG. 32 illustrates an example of another state of the switches 43 to 45 in which the WSSs 21, 22, and 23 (a mark x) of the optical branching/coupling device 12 fail.

In FIG. 32, the control unit 70 controls the switch 43 and the switch 44 in such a way as to directly output an optical signal [CA][CB] received from the C terminal 3 to the A terminal 1 and the B terminal 2. The control unit 70 controls the switch 45 in such a way as to directly output an optical signal [AB][AC] received from the A terminal 1 to the C terminal 3. As a result, the optical branching/coupling device 12 in FIG. 32 can maintain, even when the WSSs 20 to 22 fail, bidirectional communication between the A terminal 1 and the C terminal 3.

(22) Case [6] where WSSs 21 to 23 Fail

Figure 33:
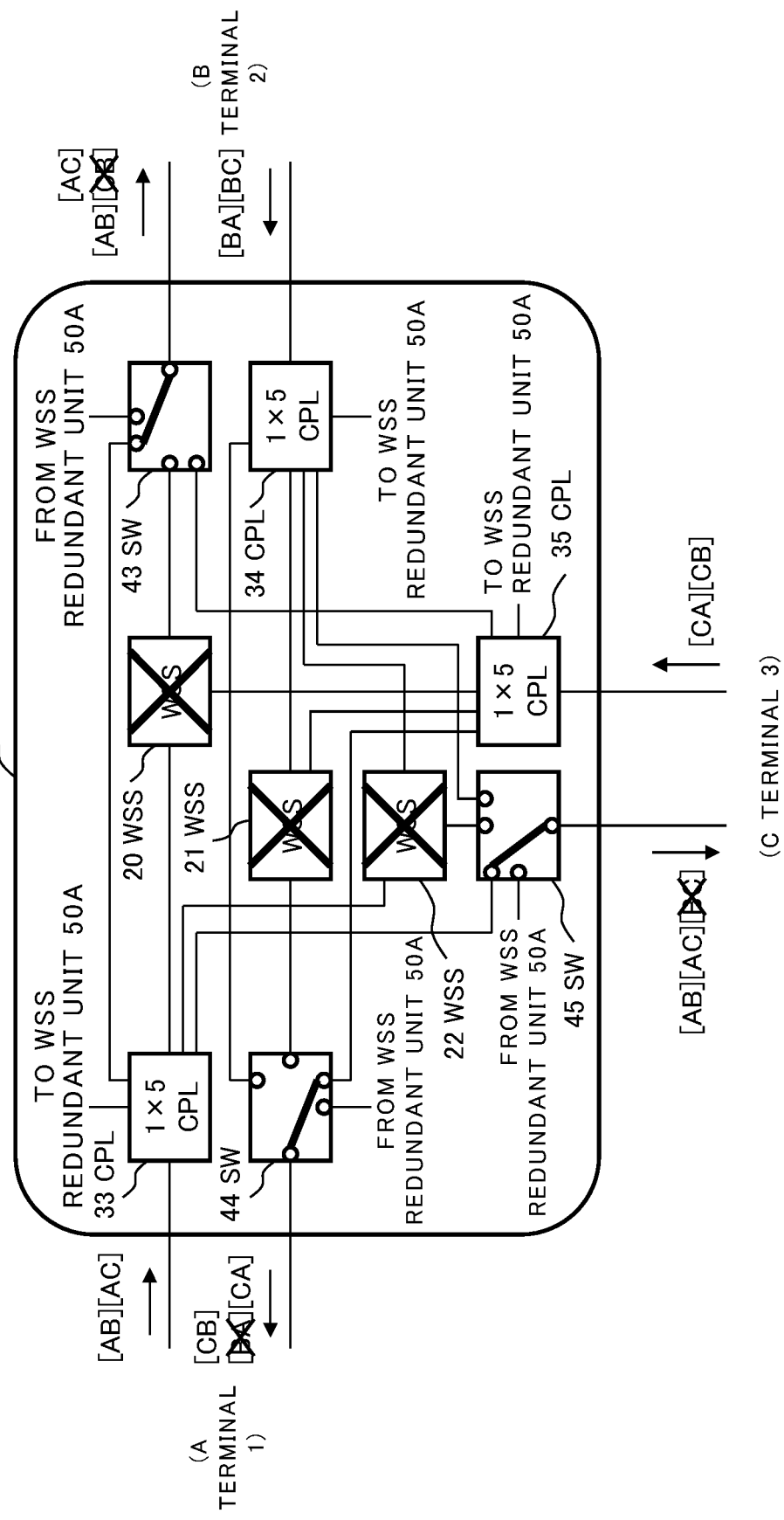
FIG. 33 is a diagram illustrating an example of another state of the switches 43 to 45 in which the WSSs 21 to 23 fail.

FIG. 33 illustrates an example of another state of the switches 43 to in which the WSSs 21, 22, and 23 (a mark x) of the optical branching/coupling device 12 fail.

In FIG. 33, the control unit 70 controls the switch 43 and the switch 45 in such a way as to directly output an optical signal [AB][AC] received from the A terminal 1 to the B terminal 2 and the C terminal 3. The control unit 70 controls the switch 44 in such a way as to directly output an optical signal [CA][CB] received from the C terminal 3 to the A terminal 1. As a result, the optical branching/coupling device 12 in FIG. 33 can maintain, even when the WSSs 20 to 22 fail, bidirectional communication between the A terminal 1 and the C terminal 3.

Figure 34:
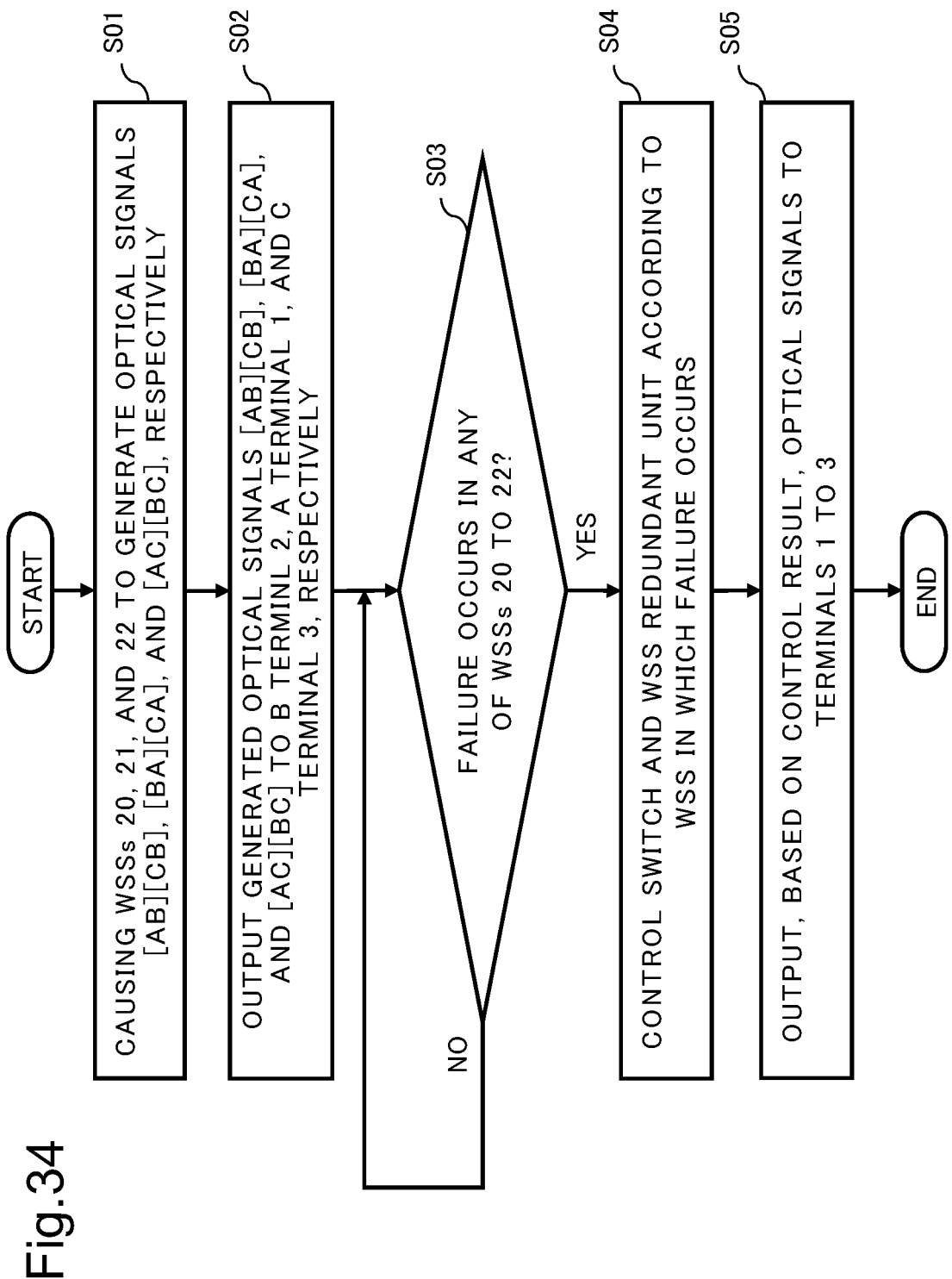
FIG. 34 is a flowchart illustrating an example of a basic operation step of each of the optical branching/coupling devices 11 to 13.
Figure 35:
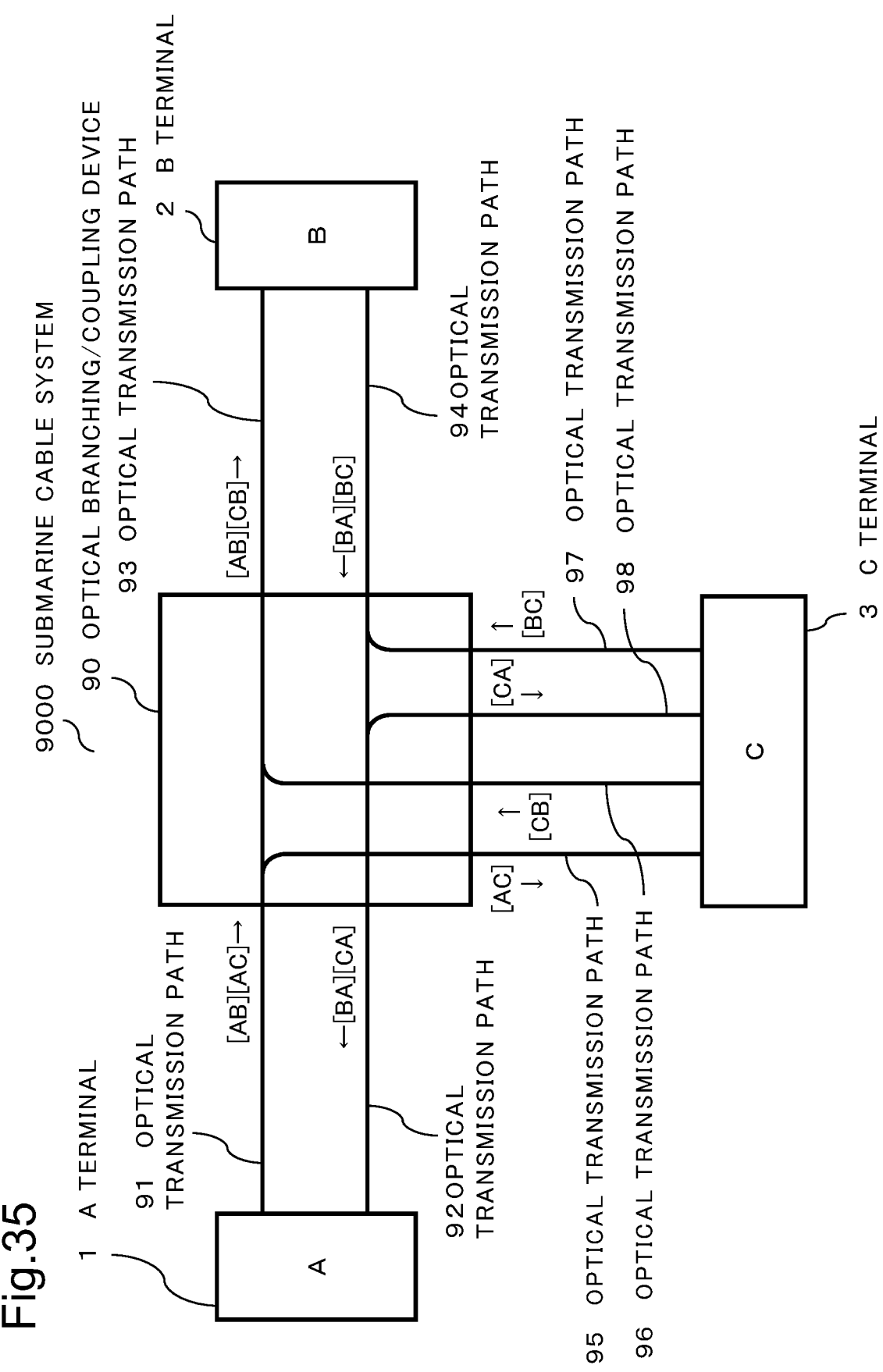
FIG. 35 is a diagram illustrating a configuration of a common submarine cable system 9000.

FIG. 34 is a flowchart illustrating an example of a basic operation step of each of the optical branching/coupling devices 11 to 13. The WSSs 20, 21, and 22 each generate, at a normal time, based on input optical signals, an optical signal [AB][CB], an optical signal [BA][CA], and an optical signal [AC][BC], respectively (step S01 in FIG. 34). The generated optical signal [AB][CB], optical signal [BA][CA], and optical signal [AC][BC] each are output to the B terminal 2, the A terminal 1, and the C terminal 3, respectively (S02). When failure occurs in any one of the WSSs 20 to 22 (S03: YES), the control unit 70 controls, based on a WSS in which failure occurs, the switches 40 to 45 and the WSS redundant units 50 and 50A (S04). Examples of operations of the switches 40 to 45 and the WSS redundant units 50 and 50A controlled by the control unit 70 have been described in detail according to the example embodiments described above. The optical branching/coupling devices 11 to 13 each output, based on a control result, optical signals to the terminals 1 to 3 (505).

The whole or part of the example embodiments described above can be described as, but not limited to, the following supplementary notes.

(Supplementary Note 1)
An optical branching/coupling device including:
first to third optical transmission paths that each input and output a wavelength-multiplexed optical signal;
a first multiplexing/demultiplexing means for outputting, based on wavelength-multiplexed optical signals being input from the second and third optical transmission paths, a first optical signal to be output from the first optical transmission path, outputting, based on wavelength-multiplexed optical signals being input from the first and third optical transmission paths, a second optical signal to be output from the second optical transmission path, and outputting, based on wavelength-multiplexed optical signals being input from the first and second optical transmission paths, a third optical signal to be output from the third optical transmission path;
a second multiplexing/demultiplexing means for outputting, based on wavelength-multiplexed signals being input from the first to third optical transmission paths, any one of the first to third optical signals;
an optical branching means for distributing wavelength-multiplexed optical signals being input from the first to third optical transmission paths to the first and second multiplexing/demultiplexing means; and
an optical switching means for selecting, based on each output destination, either of the first to third optical signals being generated in the first multiplexing/demultiplexing means and the first to third optical signals being generated in the second multiplexing/demultiplexing means, and outputting the selected optical signals to the output destination.

(Supplementary Note 2)
The optical branching/coupling device according to supplementary note 1, further including
an optical bypass circuit that connects the optical branching means and the optical switching means, wherein
the optical branching means further outputs, to the optical bypass circuit, wavelength-multiplexed optical signals being input from the first to third optical transmission paths, and
the optical switching means selects any one of
the first to third optical signals being generated in the first multiplexing/demultiplexing means,
the first to third optical signals being generated in the second multiplexing/demultiplexing means, and
a wavelength-multiplexed optical signal propagating in the optical bypass circuit.

(Supplementary Note 3)
The optical branching/coupling device according to supplementary note 1, wherein
a plurality of the second multiplexing/demultiplexing means are disposed in parallel with the first multiplexing/demultiplexing means,
the optical branching means further distributes, to a plurality of the second multiplexing/demultiplexing means, wavelength-multiplexed optical signals being input from the first to third optical transmission paths, and
the optical switching means selects, based on each output destination, the first to third optical signals being generated in the first multiplexing/demultiplexing means and the first to third optical signals being generated in a plurality of the second multiplexing/demultiplexing means, and outputs the selected optical signals to the output destination.

(Supplementary Note 4)
The optical branching/coupling device according to any one of supplementary notes 1 to 3, further including
a control means for controlling the first and second multiplexing/demultiplexing means and the optical switching means in such a way as to output at least two of the first to third optical signals to each output destination.

(Supplementary Note 5)
The optical branching/coupling device according to supplementary note 4, further including the control means externally.

(Supplementary Note 6)
The optical branching/coupling device according to supplementary note 4 or 5, wherein
the control means controls, when any one of the first to third optical signals cannot be generated in the first multiplexing/demultiplexing means, the second multiplexing/demultiplexing means and the optical switching means in such a way as to generate an optical signal that cannot be generated in at least one of the second multiplexing/demultiplexing means and output, based on an output destination, the generated optical signal.

(Supplementary Note 7)
An optical transmission system including
first to third terminals each being connected to each of the first to third optical transmission paths in such a way as to be communicable with the optical branching/coupling device according to any one of supplementary notes 1 to 6.

(Supplementary Note 8)
The optical transmission system according to supplementary note 7, wherein
the optical branching/coupling device is installed on a sea bottom, and the first to third terminals are installed on land.

(Supplementary Note 9)
A method of controlling an optical branching/coupling device including first to third optical transmission paths each inputting/outputting a wavelength-multiplexed optical signal, the method including:
by a first multiplexing/demultiplexing means,
outputting, based on wavelength-multiplexed optical signals being input from the second and third optical transmission paths, a first optical signal to be output from the first optical transmission path,
outputting, based on wavelength-multiplexed optical signals being input from the first and third optical transmission paths, a second optical signal to be output from the second optical transmission path, and outputting, based on wavelength-multiplexed optical signals being input from the first and second optical transmission paths, a third optical signal to be output from the third optical transmission path;

by a second multiplexing/demultiplexing means, outputting, based on wavelength-multiplexed signals being input from the first to third optical transmission paths, any one of the first to third optical signals;

by an optical branching means, distributing wavelength-multiplexed optical signals being input from the first to third optical transmission paths to the first and second multiplexing/demultiplexing means; and, by an optical switching means, selecting, based on each output destination, either of the first to third optical signals being generated in the first multiplexing/demultiplexing means and the first to third optical signals being generated in the second multiplexing/demultiplexing means, and outputting the selected optical signals to the output destination.

(Supplementary Note 10)

The method of controlling an optical branching/coupling device according to supplementary note 9, further including:

connecting, by an optical bypass circuit, the optical branching means and the optical switching means;

further outputting, to the optical bypass circuit, wavelength-multiplexed optical signals being input from the first to third optical transmission paths; and selecting any one of the first to third optical signals being generated in the first multiplexing/demultiplexing means, the first to third optical signals being generated in the second multiplexing/demultiplexing means, and a wavelength-multiplexed optical signal propagating in the optical bypass circuit.

(Supplementary Note 11)

The method of controlling an optical branching/coupling device according to supplementary note 9, further including:

disposing a plurality of the second multiplexing/demultiplexing means in parallel with the first multiplexing/demultiplexing means;

further distributing, to a plurality of the second multiplexing/demultiplexing means, wavelength-multiplexed optical signals being input from the first to third optical transmission paths; and selecting, based on each output destination, the first to third optical signals being generated in the first multiplexing/demultiplexing means and the first to third optical signals being generated in a plurality of the second multiplexing/demultiplexing means; and outputting the selected optical signals to the output destination.

(Supplementary Note 12)

The method of controlling an optical branching/coupling device according to any one of supplementary notes 9 to 11, further including controlling the first and second multiplexing/demultiplexing means and the optical switching means in such a way as to output at least two of the first to third optical signals to each output destination.

(Supplementary Note 13)

The method of controlling an optical branching/coupling device according to any one of supplementary notes 9 to 12, further including generating, when at least one of the first to third optical signals cannot be generated in the first multiplexing/demultiplexing means, the optical signal that cannot be generated in at least one of the second multiplexing/demultiplexing means, and outputting, based on an output destination, the generated optical signal.

(Supplementary Note 14)

A control program for an optical branching/coupling device including first to third optical transmission paths each inputting/outputting a wavelength-multiplexed optical signal, the control program causing:

a first multiplexing/demultiplexing means to execute a procedure of outputting, based on wavelength-multiplexed optical signals being input from the second and third optical transmission paths, a first optical signal to be output from the first optical transmission path, outputting, based on wavelength-multiplexed optical signals being input from the first and third optical transmission paths, a second optical signal to be output from the second optical transmission path, and outputting, based on wavelength-multiplexed optical signals being input from the first and second optical transmission paths, a third optical signal to be output from the third optical transmission path;

a second multiplexing/demultiplexing means to execute a procedure of outputting, based on wavelength-multiplexed signals being input from the first to third optical transmission paths, any one of the first to third optical signals; and an optical switching means to execute a procedure of selecting, based on each output destination, either of the first to third optical signals being generated in the first multiplexing/demultiplexing means and the first to third optical signals being generated in the second multiplexing/demultiplexing means.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Configurations described according to example embodiments are not necessarily exclusive to each other. Advantageous effects according to the present invention may be achieved by a configuration acquired by combining the whole or part of the above-described example embodiments.

A function and a step described in each example embodiment described above may be achieved by executing a program, by using a central processing unit (CPU) included in the control unit 70. The program is recorded in a fixed and non-transitory recording medium. As the recording medium, a semiconductor memory or a fixed magnetic disk device is used without limitation thereto.

This application is based upon and claims the benefit of priority from Japanese patent application No. 2020-159231, filed on Sep. 24, 2020, the disclosure of which is incorporated herein in its entirety by reference.

REFERENCE SIGNS LIST

1 A terminal
2 B terminal
3 C terminal
10 to 13, 90 Optical branching/coupling device 30 to 38 Coupler (CPL)
40 to 49 Switch (SW)
50, 50A, 51, 52 WSS redundant unit
60 Switch unit
70 Control unit
81 to 86, 81A to 86A, 91 to 98 Optical transmission path
1000, 9000 Submarine cable system

What is claimed is:

1. An optical branching/coupling device comprising:
first, second and third optical transmission paths, each configured to input and output a wavelength-multiplexed optical signal;
a first multiplexing/demultiplexing circuit configured to output, based on wavelength-multiplexed optical signals input from the second and third optical transmission paths, a first optical signal to be output from the first optical transmission path, output, based on wavelength-multiplexed optical signals input from the first and third optical transmission paths, a second optical signal to be output from the second optical transmission path, and output, based on wavelength-multiplexed optical signals input from the first and second optical transmission paths, a third optical signal to be output from the third optical transmission path;
a second multiplexing/demultiplexing circuit configured to output, based on wavelength-multiplexed optical signals input from the first, second and third optical transmission paths, any one of the first, second and third optical signals;
an optical branching circuit configured to distribute wavelength-multiplexed optical signals being input from the first, second and third optical transmission paths to the first and second multiplexing/demultiplexing circuits; and
an optical switch configured to select, based on each output destination, either of the first, second and third optical signals generated in the first multiplexing/demultiplexing circuit and the first, second and third optical signals generated in the second multiplexing/demultiplexing circuit, and output the selected optical signals to the output destination.

2. The optical branching/coupling device according to claim 1, further comprising:
an optical bypass circuit configured to connect the optical branching circuit and the optical switch, wherein:
the optical branching circuit is further configured to output, to the optical bypass circuit, wavelength-multiplexed optical signals input from the first, second and third optical transmission paths, and
the optical switch is configured to select any one of:
the first, second and third optical signals generated in the first multiplexing/demultiplexing circuit;
the first, second and third optical signals generated in the second multiplexing/demultiplexing circuit; and
a wavelength-multiplexed optical signal propagating in the optical bypass circuit.

3. The optical branching/coupling device according to claim 1, wherein:
a plurality of the second multiplexing/demultiplexing circuits are disposed in parallel with the first multiplexing/demultiplexing circuit,
the optical branching circuit is further configured to distribute, to the plurality of the second multiplexing/demultiplexing circuits, wavelength-multiplexed optical signals input from the first, second and third optical transmission paths, and
the optical switch is configured to select, based on each of the output destinations, the first, second and third optical signals generated in the first multiplexing/demultiplexing circuit and the first, second and third optical signals generated in the plurality of the second multiplexing/demultiplexing circuits, and to output the selected optical signals to the output destination.

4. The optical branching/coupling device according to claim 3, further comprising:
a controller configured to control the first and second multiplexing/demultiplexing circuit and the optical switch in such a way as to output at least two of the first, second and third optical signals to each of the output destinations.

5. The optical branching/coupling device according to claim 4, wherein the controller is external.

6. The optical branching/coupling device according to claim 4, wherein:
the controller is configured to control, when any one of the first, second and third optical signals cannot be generated in the first multiplexing/demultiplexing circuit, the second multiplexing/demultiplexing circuit and the optical switch in such a way as to generate an optical signal that cannot be generated in at least one of the second multiplexing/demultiplexing circuit and output, based on the output destination, the generated optical signal.

7. An optical transmission system comprising:
first, second and third terminals each connected to each of the first, second and third optical transmission paths in such a way as to be communicable with the optical branching/coupling device according to claim 1.

8. The optical transmission system according to claim 7, wherein the optical branching/coupling device is installed on a sea bottom, and the first, second and third terminals are installed on land.

9. The optical branching/coupling device according to claim 2, further comprising a controller configured to control the first and second multiplexing/demultiplexing circuit and the optical switch in such a way as to output at least two of the first, second and third optical signals to each of the output destinations.

10. An optical transmission system comprising first, second and third terminals each connected to each of the first, second and third optical transmission paths in such a way as to be communicable with the optical branching/coupling device according to claim 2.

11. A method of controlling an optical branching/coupling device including first, second and third optical transmission paths each inputting/outputting a wavelength-multiplexed optical signal, the method comprising:
by a first multiplexing/demultiplexing circuit:
outputting, based on wavelength-multiplexed optical signals input from the second and third optical transmission paths, a first optical signal to be output from the first optical transmission path;
outputting, based on wavelength-multiplexed optical signals input from the first and third optical transmission paths, a second optical signal to be output from the second optical transmission path; and
outputting, based on wavelength-multiplexed optical signals input from the first and second optical transmission paths, a third optical signal to be output from the third optical transmission path;
by a second multiplexing/demultiplexing circuit, outputting, based on wavelength-multiplexed optical signals input from the first, second and third optical transmission paths, any one of the first, second and third optical signals;

by an optical branching circuit, distributing wavelength-multiplexed optical signals input from the first, second and third optical transmission paths to the first and second multiplexing/demultiplexing circuits; and by an optical switch:
selecting, based on each output destination, either of the first, second and third optical signals generated in the first multiplexing/demultiplexing circuit and the first, second and third optical signals generated in the second multiplexing/demultiplexing circuit; and
outputting the selected optical signals to the output destination.

12. The method of controlling an optical branching/coupling device according to claim 11, the method further comprising:
connecting, by an optical bypass circuit, the optical branching circuit and the optical switch;
further outputting, to the optical bypass circuit, wavelength-multiplexed optical signals input from the first, second and third optical transmission paths; and
selecting any one of the first, second and third optical signals generated in the first multiplexing/demultiplexing circuit, the first, second and third optical signals generated in the second multiplexing/demultiplexing circuit, and a wavelength-multiplexed optical signal propagating in the optical bypass circuit.

13. The method of controlling an optical branching/coupling device according to claim 11, the method further comprising:
disposing a plurality of the second multiplexing/demultiplexing circuits in parallel with the first multiplexing/demultiplexing circuit;
further distributing, to a plurality of the second multiplexing/demultiplexing circuits, wavelength-multiplexed optical signals input from the first, second and third optical transmission paths; and
selecting, based on each of the output destinations, the first, second and third optical signals generated in the first multiplexing/demultiplexing circuit and the first, second and third optical signals generated in a plurality of the second multiplexing/demultiplexing circuits; and
outputting the selected optical signals to the output destination.

14. The method of controlling an optical branching/coupling device according to claim 11, the method further comprising controlling the first and second multiplexing/demultiplexing circuits and the optical switch in such a way as to output at least two of the first, second and third optical signals to each of the output destinations.

15. The method of controlling an optical branching/coupling device according to claim 13, the method further comprising:
generating, when at least one of the optical signals cannot be generated in the first multiplexing/demultiplexing circuit, the optical signal that cannot be generated in at least one of the second multiplexing/demultiplexing circuits, and outputting, based on the output destination, the generated optical signal.

16. A tangible and non-transitory recording medium storing instructions of a control program for an optical branching/coupling device including first, second and third optical transmission paths, each inputting/outputting a wavelength-multiplexed optical signal, the control program causing:
a first multiplexing/demultiplexing circuit to execute a procedure comprising:
outputting, based on wavelength-multiplexed optical signals input from the second and third optical transmission paths, a first optical signal to be output from the first optical transmission path;
outputting, based on wavelength-multiplexed optical signals input from the first and third optical transmission paths, a second optical signal to be output from the second optical transmission path; and
outputting, based on wavelength-multiplexed optical signals input from the first and second optical transmission paths, a third optical signal to be output from the third optical transmission path;
a second multiplexing/demultiplexing circuit to execute a procedure of outputting, based on wavelength-multiplexed optical signals input from the first, second and third optical transmission paths, any one of the first, second and third optical signals; and
an optical switch to execute a procedure of selecting, based on each output destination, any of the first, second and third optical signals generated in the first multiplexing/demultiplexing circuit and the first, second and third optical signals generated in the second multiplexing/demultiplexing circuit.

* * * * *